US011249576B2

(12) United States Patent
Tanaka

(10) Patent No.: US 11,249,576 B2
(45) Date of Patent: Feb. 15, 2022

(54) INPUT DEVICE GENERATING VIBRATION AT PERIPHERAL REGIONS OF USER INTERFACES

(71) Applicant: Panasonic Intellectual Property Management Co., Ltd., Osaka (JP)

(72) Inventor: Tsuyoshi Tanaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/112,174

(22) Filed: Dec. 4, 2020

(65) Prior Publication Data

US 2021/0173509 A1 Jun. 10, 2021

(30) Foreign Application Priority Data

Dec. 9, 2019 (JP) .............................. JP2019-221945
Jun. 17, 2020 (JP) .............................. JP2020-104489

(51) Int. Cl.
*G06F 3/041* (2006.01)
*G06F 3/0488* (2022.01)
*G06F 3/01* (2006.01)

(52) U.S. Cl.
CPC ............ *G06F 3/0414* (2013.01); *G06F 3/016* (2013.01); *G06F 3/04883* (2013.01)

(58) Field of Classification Search
CPC .... G06F 3/016; G06F 3/0414; G06F 3/04883; G06F 3/0488; G06F 3/041; G06F 1/1643;

(Continued)

(56) References Cited

U.S. PATENT DOCUMENTS

2008/0296072 A1\* 12/2008 Takashima .............. G06F 3/016
178/18.01
2012/0256858 A1\* 10/2012 Sudo ....................... G06F 3/018
345/173

(Continued)

FOREIGN PATENT DOCUMENTS

JP 2017-130021 7/2017
JP 2017130021 A \* 7/2017

(Continued)

OTHER PUBLICATIONS

Office Action from Japan Patent Office (JPO) in Japanese Patent Appl. No. 2020-104489, dated Aug. 17, 2021, together with a partial English language translation.

*Primary Examiner* — Richard J Hong
(74) *Attorney, Agent, or Firm* — Greenblum & Bernstein, P.L.C.

(57) ABSTRACT

An input device includes: a touch sensor that detects a touch position touched by an operating body on an operation screen; a vibrator that is activated in an ultrasonic band to provide haptic feedback on the operation screen; and a controller that is electrically connected to the touch sensor and the vibrator. The controller receives an input made to the touch sensor through a gesture in a predetermined direction from an initial position, activates the vibrator when the touch sensor receives a shorter-in-length gesture in the predetermined direction from the initial position, and deactivates the vibrator when the touch sensor receives a longer-in-length gesture in the predetermined direction from the initial position.

10 Claims, 17 Drawing Sheets

(58) Field of Classification Search
CPC ......... G06F 3/018; G06F 3/044; B60K 37/06; B60K 35/00
See application file for complete search history.

(56) References Cited

U.S. PATENT DOCUMENTS

| | | | | |
|---|---|---|---|---|
| 2012/0327006 | A1* | 12/2012 | Israr | G06F 3/016 345/173 |
| 2013/0222339 | A1* | 8/2013 | Koga | G06F 3/016 345/174 |
| 2014/0347322 | A1* | 11/2014 | Kamata | G06F 3/041 345/174 |
| 2015/0370329 | A1* | 12/2015 | Koyama | B60K 35/00 345/173 |
| 2016/0349846 | A1 | 12/2016 | Sugiura et al. | |
| 2016/0349847 | A1* | 12/2016 | Sugiura | G06F 3/044 |
| 2017/0220114 | A1* | 8/2017 | Iino | B60K 37/06 |
| 2017/0329429 | A1* | 11/2017 | Toyoda | G06F 3/041 |
| 2018/0024638 | A1* | 1/2018 | Endo | G06F 3/0416 345/173 |
| 2018/0088770 | A1* | 3/2018 | Brombach | G06F 3/0488 |
| 2020/0142489 | A1* | 5/2020 | Nakamura | G06F 1/1643 |
| 2021/0055798 | A1* | 2/2021 | Tomaru | G06F 3/0488 |

FOREIGN PATENT DOCUMENTS

| | | | |
|---|---|---|---|
| JP | 2019153272 A | * | 9/2019 |
| WO | 2015/121955 | | 8/2015 |

* cited by examiner

INPUT DEVICE GENERATING VIBRATION AT PERIPHERAL REGIONS OF USER INTERFACES

CROSS REFERENCE TO RELATED APPLICATIONS

The present application is based on and claims priority of Japanese Patent Application No. 2019-221945 filed on Dec. 9, 2019, and Japanese Patent Application No. 2020-104489 filed on Jun. 17, 2020.

FIELD

The present disclosure relates to an input device that provides haptic feedback in response to an input received from a touch sensor.

BACKGROUND

Patent Literature (PTL) 1 discloses a haptic feedback device that provides haptic feedback creating a sensation as if a finger was pulled toward a target.

CITATION LIST

Patent Literature

PTL 1: Japanese Unexamined Patent Application Publication No. 2017-130021

SUMMARY

However, the haptic device according to PTL 1 described above can be improved upon.

In view of this, the present disclosure provides an input device capable of improving upon the above related art.

In accordance with an aspect of the present disclosure, an input device includes: a touch sensor that detects a touch position touched by an operating body on an operation screen; a vibrator that is activated in an ultrasonic band to provide haptic feedback on the operation screen; and a controller that is electrically connected to the touch sensor and the vibrator, wherein the controller receives, as a first input, an input made to the touch sensor through a first gesture in a predetermined direction, activates the vibrator when the touch sensor receives a second gesture having a second length shorter than a first length of the first gesture in the predetermined direction from an initial position of the first gesture, and deactivates the vibrator when the touch sensor receives a third gesture having a third length longer than the second length and shorter than the first length in the predetermined direction from the initial position.

These general and specific aspects may be implemented to a system, a method, an integrated circuit, a computer program, or a computer-readable recording medium such as a Compact Disc-Read Only Memory (CD-ROM), or may be any combination of them.

An input device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
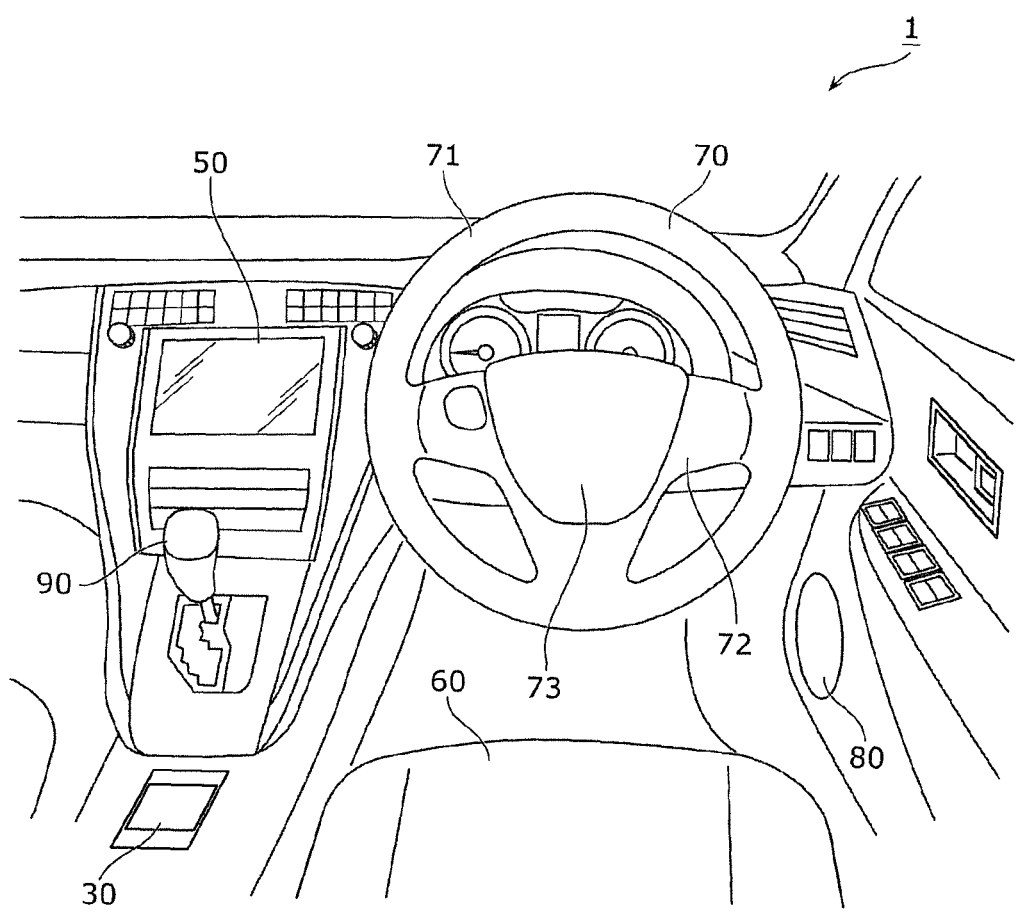
FIG. 1 illustrates an example of a configuration including an input device according to Embodiment and an interior of a vehicle provided with the input device.

Underlying Knowledge Forming Basis of the Present Disclosure

The inventors have found that the haptic feedback device mentioned in "Background" causes the following issue.

The haptic feedback device described above provides haptic feedback as follows. When a user slides a finger of the user on a touchpad of the device and the finger on the touchpad reaches a peripheral region of a target, including a boundary of the target, corresponding to an icon displayed on a display device, a predetermined drive voltage is applied to an actuator so that friction on the finger is reduced. Moreover, when the finger is in a region other than the peripheral region, the haptic feedback device performs control by applying a voltage smaller than the predetermined drive voltage to the actuator so that the friction on the finger increases. In this way, the haptic feedback device achieves haptic feedback creating the sensation as if the finger was pulled toward the target.

Unfortunately, when the user slides the finger fast on this haptic feedback device for example, the friction on the finger is reduced in the peripheral region. This may cause the user to unintentionally pass by the target region. Thus, the user needs to slow down the slide movement of the finger to stop at the target region. In this way, it is difficult for the user to make an input to the touch sensor as intended.

As a result of earnest study to solve the aforementioned issue, the inventors have achieved an input device having a configuration described below.

In accordance with an aspect of the present disclosure, an input device includes: a touch sensor that detects a touch position touched by an operating body on an operation screen; a vibrator that is activated in an ultrasonic band to provide haptic feedback on the operation screen; and a controller that is electrically connected to the touch sensor and the vibrator, wherein the controller receives, as a first input, an input made to the touch sensor through a first gesture in a predetermined direction, activates the vibrator when the touch sensor receives a second gesture having a second length shorter than a first length of the first gesture in the predetermined direction from an initial position of the first gesture, and deactivates the vibrator when the touch sensor receives a third gesture having a third length longer than the second length and shorter than the first length in the predetermined direction from the initial position.

With this, the vibrator is deactivated in the first gesture when the third gesture is received. Thus, the vibrator can be deactivated before the finger reaches a position at which the first gesture is completed. In other words, the vibrator is deactivated at a position before the finger reaches, from a previous target region, the peripheral region of the target, so that friction on the finger increases. Thus, the deactivation of the vibrator that results in the increase of the friction coefficient on the operation screen acts as a trigger for the user to stop moving the operating body. Then, the user can easily position the operating body at the position where the input for the first gesture is completed. This allows the user to easily make an input (the first input) to the touch sensor through the gesture (the first gesture) having a length as intended.

It is possible that the controller receives, as a second input different from the first input, an input made through a fourth gesture having a fourth length exceeding the first length in the predetermined direction from the initial position.

Thus, a second haptic feedback felt by counting the number of times that the friction coefficient changes enables the user to know that the finger moves beyond a range of the first gesture and reaches a range in which an input for the four gesture is made. This allows the user to easily position the operating body at a position where the fourth gesture is completed. Thus, the user can easily make an input (the second input) to the touch sensor through the fourth gesture.

It is also possible that the controller further (i) calculates a moving speed of the operating body in the second gesture using an amount of change per unit time in the touch position detected by the touch sensor, and (ii) activates the vibrator with a drive voltage that decreases as the moving speed calculated increases.

For the second input through the fourth gesture made by the user, first haptic feedback with amplitude greater than predetermined amplitude between the second gesture and the third gesture causes a friction coefficient during the haptic feedback to be smaller than a predetermined friction coefficient. Thus, if the haptic feedback stops, an increase in the friction coefficient between before and after the haptic feedback is greater than a predetermined value. This applies a stronger brake to the operating body in a region through which the operating body is to pass. Thus, when the user performs the second input through the fourth gesture, a strong brake by the haptic feedback provided before the second haptic feedback corresponding to the completion of the fourth gesture interferes a smooth input of the fourth gesture.

Here, when the user performs the second input through the fourth gesture, a moving speed of the operating body for the second gesture is assumed to be faster than a predetermined speed. On this account, the vibrator is activated with a drive voltage that decreases as the moving speed increases, so that vibration amplitude of the vibrator is reduced for the first haptic feedback. As a result, the increase of the friction coefficient can be reduced when the user makes the fourth gesture. This reduces the brake applied by the haptic feedback to the operating body in the fourth gesture of the user, and thus allows the second input through the fourth gesture to be performed smoothly.

It is further possible that the controller activates the vibrator with the drive voltage corresponding to the moving speed according to a first relationship in which the drive voltage of the vibrator decreases as the moving speed increases at a decrease rate that is constant with respect to the increase of the moving speed.

This enables the vibrator to be easily activated with amplitude that decreases as the moving speed of the operating body increases.

It is still further possible that the controller activates the vibrator with the drive voltage corresponding to the moving speed according to a second relationship in which the drive voltage of the vibrator decreases as the moving speed increases at a decrease rate that decreases as the moving speed increases.

Thus, an amplitude decrease rate can be reduced in a region in which the moving speed of the operating body is faster than a predetermined speed as compared to a region in which the moving speed of the operating body is slower than the predetermined speed.

It is still further possible that the input device further includes a load sensor that is included in the touch sensor and detects a touch load on the touch sensor, wherein the controller further (i) calculates a moving speed of the operating body in the second gesture using an amount of change per unit time in the touch position detected by the touch sensor, and (ii) activates the vibrator with a drive voltage that decreases as the moving speed calculated increases and that also decreases as the touch load obtained from the load sensor in the second gesture decreases.

For the second input through the fourth gesture made by the user, first haptic feedback with amplitude greater than predetermined amplitude between the second gesture and the third gesture causes a friction coefficient during the haptic feedback to be smaller than a predetermined friction coefficient. Thus, if the haptic feedback stops, an increase in the friction coefficient between before and after the haptic feedback is greater than a predetermined value. This applies a stronger brake to the operating body in a region through which the operating body is to pass. Thus, when the user performs the second input through the fourth gesture, a strong brake by the haptic feedback provided before the second haptic feedback corresponding to the completion of the fourth gesture interferes a smooth input of the fourth gesture.

Here, when the user performs the second input through the fourth gesture, a moving speed of the operating body for the second gesture is assumed to be faster than a predetermined speed and a touch load in the second gesture is assumed to be smaller than a predetermined load. On this account, the vibrator is activated with a drive voltage that decreases as the moving speed increases and that also decreases as the touch load decreases, so that vibration amplitude of the vibrator is reduced for the haptic feedback provided between the second gesture and the third gesture. As a result, the increase of the friction coefficient can be reduced when the user makes the fourth gesture. This enhances the accuracy of predicting that the user may perform the fourth gesture and also reduces the brake caused by the haptic feedback to the operating body in the fourth gesture. Thus, the second input through the fourth gesture can be performed smoothly.

It is still further possible that the controller activates the vibrator with the drive voltage that corresponds to the moving speed according to a first relationship in which the drive voltage of the vibrator decreases as the moving speed increases at a decrease rate that is constant with respect to the increase of the moving speed and that also corresponds to the touch load according to a third relationship in which the drive voltage decreases as the touch load decreases at a decrease rate that is constant with respect to the decrease of the touch load.

This enables the vibrator to be easily activated with amplitude that decreases as the moving speed of the operating body increases and that also decreases as the touch load decreases.

It is still further possible that the controller activates the vibrator with the drive voltage that corresponds to the moving speed according to a second relationship in which the drive voltage of the vibrator decreases as the moving speed increases at a decrease rate that decreases as the moving speed increases and that also corresponds to the touch load according to a fourth relationship in which the drive voltage of the vibrator decreases as the touch load decreases at a decrease rate that decreases as the touch load decreases.

Thus, an amplitude decrease rate can be reduced in a region in which the moving speed of the operating body is faster than a predetermined speed as compared to a region in which the moving speed of the operating body is slower than the predetermined speed. Moreover, the amplitude decrease rate can be reduced in a region in which the touch load is smaller than a predetermined load as compared to a region in which the touch load is larger than the predetermined load.

It is still further possible that the input device further includes a display that is electrically connected to the controller, wherein the controller (i) causes the display to selectively display one of a plurality of user interfaces (UIs) and (ii) changes the first length, the second length, and the third length for specifying the first gesture, the second gesture, and the third gesture, respectively, according to the one of the plurality of UIs displayed on the display.

Thus, the length of the first gesture can be changed according to the user interface (UI). This allows the user to easily perform an input appropriate to the UI.

It is still further possible that each of the plurality of UIs includes a plurality of selection targets, and that the controller changes the first length, the second length, and the third length, in accordance with at least one of: a size of one selection target among the plurality of selection targets included in the one of the plurality of UIs displayed on the display; a total number of the plurality of selection targets; or a distance between the plurality of selection targets.

In this case, the first to third lengths for specifying the gestures are variable depending on a displayed status of the plurality of selection targets included in the UI displayed on the display. Thus, the accuracy of guiding the operating body to a position on the touch sensor corresponding to a desired position on the UI is increased. This allows the user to easily make an input to the touch sensor through the gesture having a length as intended.

It is still further possible that the controller increases the first length, the second length, and the third length as the one selection target increases in size.

In this case, the first to third lengths are increased as the selection target increases in size. This allows the user to feel an increase of friction on the operating body soon after the operating body reaches a region corresponding to the selection target on the touch sensor. As a result, the accuracy of guiding the operating body to a position on the touch sensor corresponding to a desired position on the UI is increased. This allows the user to easily make an input to the touch sensor through the gesture having a length as intended.

It is still further possible that the controller reduces the first length, the second length, and the third length as the total number of the plurality of selection target increases.

In this case, the first to third lengths are reduced as the total number of selection targets included in the UI increases. This allows the user to feel an increase of friction on the operating body, differently for each of multiple selection targets. As a result, the accuracy of guiding the operating body to a position on the touch sensor corresponding to a desired position on the UI is increased. This allows the user to easily make an input to the touch sensor through the gesture having a length as intended.

It is still further possible that the controller increases the first length, the second length, and the third length as the distance between the plurality of selection targets increases.

In this case, the first to third lengths are increased as the distance between selection targets included in the UI increases. This allows the user to feel an increase of friction on the operating body soon after the operating body, which has traveled a long distance, reaches a region corresponding to the selection target on the touch sensor. As a result, the accuracy of guiding the operating body to a position on the touch sensor corresponding to a desired position on the UI is increased. This allows the user to easily make an input to the touch sensor through the gesture having a length as intended.

It is still further possible that the input device further includes a display that is electrically connected to the controller, wherein the controller (i) causes the display to display a UI that includes a plurality of selection targets arranged in at least two different directions, and (ii) changes the first length, the second length, and the third length in accordance with a direction in which the operating body moves on the operation screen of the touch sensor.

In this case, the first to third lengths are variable depending on a direction in which the operating body moves. For the selection targets that are rectangles for instance, the first to third lengths are longer when the operating body moves toward the selection target in a diagonal direction than in a horizontal or vertical direction. This allows the user to feel an increase of friction on the operating body soon after the operating body reaches the selection target. As a result, the accuracy of guiding the operating body to a position on the touch sensor corresponding to a desired position on the UI is increased. This allows the user to easily make an input to the touch sensor through the gesture having a length as intended.

These general and specific aspects may be implemented to a system, a method, an integrated circuit, a computer program, or a computer-readable recording medium such as a Compact Disc-Read Only Memory (CD-ROM), or may be any combination of them.

Hereafter, an input device according to an aspect of the present disclosure is specifically described with reference to the drawings.

EMBODIMENT

[1. Configuration of Input Device]

First, the following describes a configuration including an input device according to Embodiment and an interior of a vehicle provided with the input device, with reference to FIG. 1. FIG. 1 illustrates an example of the configuration including the input device according to Embodiment and the interior of the vehicle provided with this input device. Note that a direction in which the vehicle moves forward defines forward, backward, right, and left directions in the following description. Note also that the state in which wheels of the vehicle are on the ground defines upward, downward, horizontal, and vertical directions in the following description.

The interior of automobile 1 (an example of the vehicle) illustrated in FIG. 1 is provided with touch pad 30 and display 50 that are included in input device 10. The interior of automobile 1 is further provided with shift lever 90 and steering 70. Input device 10 is used for making an input to a menu screen or a search screen that is a graphical user interface (GUI) for operating, for example, a car navigation system or audio and image reproduction equipment for reproducing an optical disc. Touchpad 30 is used for making an input to the GUI displayed on display 50 of input device 10 provided for the vehicle, such as automobile 1.

Touchpad 30 is an input interface used for making an input to the GUI displayed on display 50 of input device 10. The user is able to operate input device 10 provided for automobile 1 by making an input to the GUI.

Touchpad 30 is located behind shift lever 90. To be more specific, touchpad 30 is located in a position within reach of the user seated in seat 60 in automobile 1 although steering 70 is excluded from such position. A driver, who is the user, is able to operate input device 10 with a left hand by making an input to touchpad 30 located behind shift lever 90. Note that the position of touchpad 30 is not limited to the aforementioned position. Touchpad 30 may be located in any position within reach of the user although steering 70 is excluded from such position. Here, FIG. 1 illustrates a right-hand drive automobile as an example. For a left-hand drive automobile, the opposite is the case. Thus, the aforementioned description can be similarly applied to the left-hand drive automobile.

Steering 70 is used for steering automobile 1. Steering 70 includes: rim 71 in a shape of a ring; spoke 72 that is roughly T-shaped and integral with an inner periphery of rim 71; and horn switch cover 73 that covers a horn switch (not shown) located in a central portion of spoke 72. A configuration of touchpad 30 is described later.

Display 50 displays a map for car navigation, a reproduced image, a GUI for operating input device 10, and a GUI for controlling another in-vehicle device, for example. Display 50 is implemented by a liquid crystal display or an organic electro luminescence (EL) display, for example. Display 50 is an example of a display.

Input device 10 may be connected to speaker 80 and output audio to speaker 80. Examples of another in-vehicle device include an air conditioner. An operation of the air conditioner may be controlled through an input received by input device 10.

Next, a hardware configuration of touchpad 30 is described with reference to FIG. 2.

Figure 2:
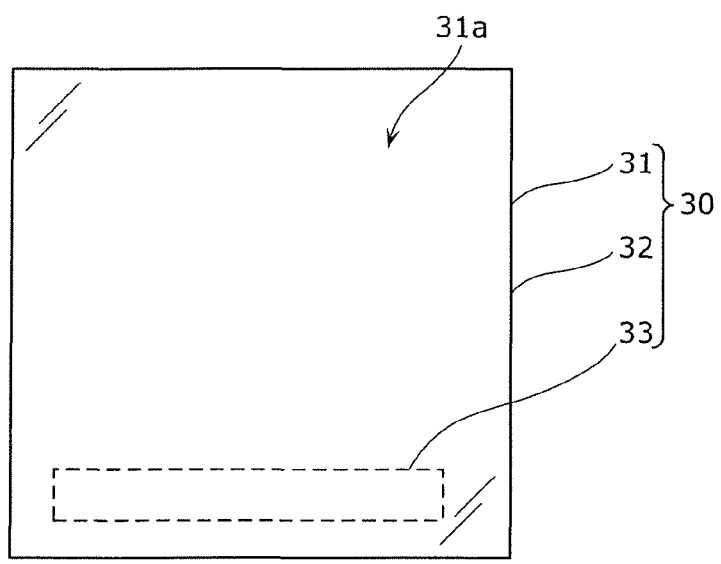
FIG. 2 is an external front view of a touchpad from above.

FIG. 2 is an external front view of the touchpad from above.

Touchpad 30 includes touch sensor 31, pressure sensor 32, and vibrator 33.

Touch sensor 31 receives a touch from operating body 20 operated by the user. Here, operating body 20 is a finger of the user or a touch pen, for example. Touch sensor 31 detects a position (a touch position) located on operation screen 31a of touch sensor 31 and touched by a body part (such as a finger) of the user or a touch pen designed for touchpads. A detection result from touch sensor 31 may be represented by two-dimensional coordinates on operation screen 31a.

Moreover, touch sensor 31 may receive a plurality of touches, that is, multi-touches, from the user. To be more specific, touch sensor 31 may be capable of receiving, in addition to a position touched by one finger, two positions touched simultaneously by two fingers and three positions touched simultaneously by three fingers.

Pressure sensor 32, which is included in touch sensor 31, is a load sensor that detects a touch load on touch sensor 31. For example, pressure sensor 32 is disposed to overlap with touch sensor 31 and detects a pressure placed on touch sensor 31 by operating body 20. Pressure sensor 32 is an example of a load sensor.

Note that a pressure greater than a predetermined pressure on pressure sensor 32 may be received as an input indicating an entry, for example. However, this is not intended to be limiting. An input indicating an entry in touchpad 30 may be performed by a double tap on touch sensor 31.

Vibrator 33 is a piezoelectric device that is activated in an ultrasonic band. Vibrator 33 is disposed on a surface opposite to operation screen 31a of touch sensor 31. Vibrator 33 is activated to provide haptic feedback to operating body 20 that is in contact with operation screen 31a. With this haptic feedback provided on operation screen 31a by vibrator 33, a dynamic friction coefficient on operation screen 31a during a gesture operation (a sliding operation) in which operating body 20 moves while keeping in contact with operation screen 31a is reduced as compared to a dynamic friction coefficient before this haptic feedback is provided. This allows operating body 20 to slide on operation screen 31a more smoothly while the haptic feedback is being provided as compared to before the haptic feedback is provided. An adjustment to vibration amplitude for the haptic feedback provided by vibrator 33 results in an adjustment to a friction coefficient of operation screen 31a for a gesture operation. This adjusts the smoothness of the sliding operation performed by operating body 20 on operation screen 31a.

In the present embodiment, touchpad 30 is disposed to be roughly perpendicular to a vertical direction. To be more specific, touchpad 30 is disposed so that operation screen 31a, which receives a touch made on touch sensor 31, faces upward. Note that touchpad 30 may be disposed to be roughly perpendicular to a front-back direction. In this case, touchpad 30 may be disposed so that operation screen 31a, which receives a touch made on touch sensor 31, faces backward, for example.

The user can make an input to GUI 11 displayed on display 50 of input device 10 through an input to touch sensor 31 or pressure sensor 32 of touchpad 30.

Here, pressure sensor 32 is described as a load sensor that detects an input made by pressing touchpad 30. However, this is not intended to be limiting. For example, a push switch may be disposed immediately below touch sensor 31, and the load sensor may detect, via the push switch, an input made by pressing touchpad 30 with a pressure greater than a predetermined pressure.

[2. Functional Configuration of Input Device]

Next, a functional configuration of the input device is described.

Figure 3:
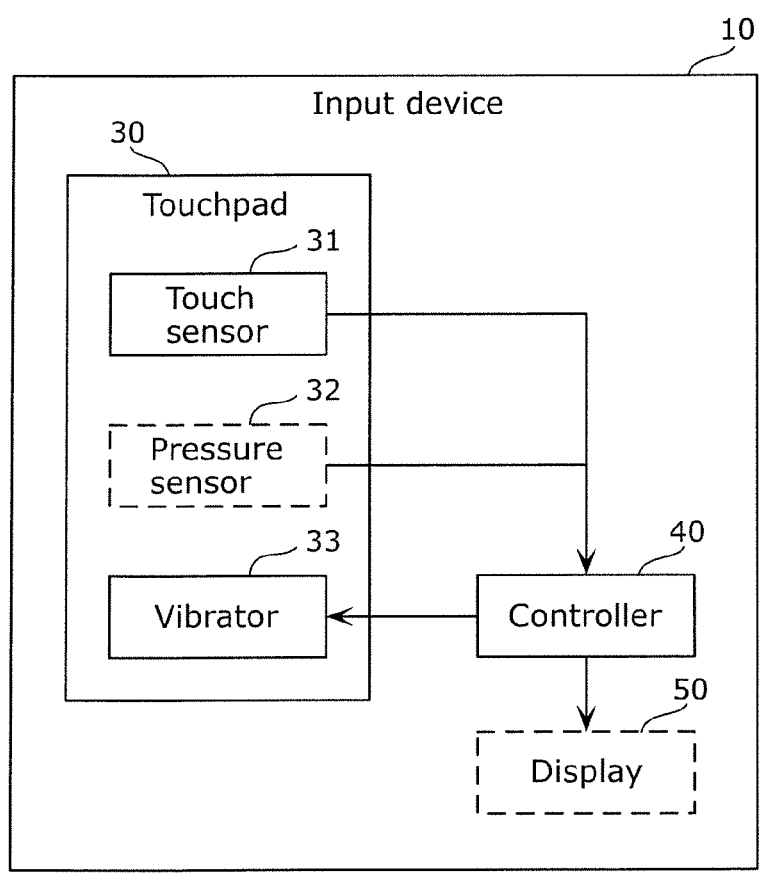
FIG. 3 is a block diagram illustrating an example of a functional configuration of the input device installed in a vehicle, according to Embodiment.

FIG. 3 is a block diagram illustrating an example of the functional configuration of the input device installed in the automobile, according to Embodiment.

As illustrated in FIG. 3, input device 10 includes touchpad 30, controller 40, and display 50.

When receiving an input to touch sensor 31 or pressure sensor 32, touchpad 30 outputs an input signal indicating this input to controller 40.

Controller 40 is electrically connected to touch sensor 31, pressure sensor 32, and vibrator 33. Controller 40 receives the input signal from touchpad 30, and then controls activation of vibrator 30 according to the received input signal. Moreover, controller 40 causes GUI 11 displayed on display 50 to change according to the input signal received from touchpad 30. The control performed by controller 40 according to the input signal is described in detail later.

Note that controller 40 may be implemented by a processor executing a predetermined program and a memory storing the predetermined program, for example. Alternatively, controller 40 may be implemented by a dedicated circuit. Controller 40 may be implemented by an electronic control unit (ECU), for example.

Figure 4:
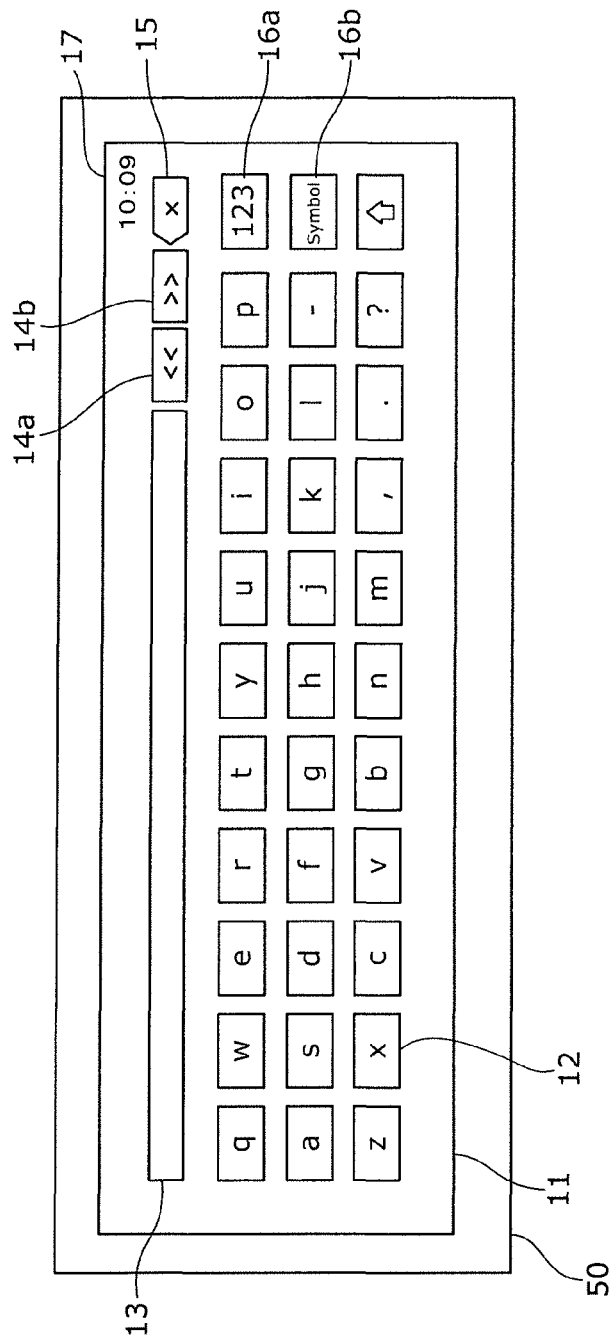
FIG. 4 illustrates an example of a GUI and a touchpad displayed on a display.

The following describes GUI 11 displayed on display 50 by controller 40, with reference to FIG. 4.

FIG. 4 illustrates an example of the GUI and the touchpad displayed on the display.

As illustrated in FIG. 4, controller 40 causes display 50 to display GUI 11 that has a keyboard layout. GUI 11 includes a plurality of selection targets 12, 14a, 14b, 15, 16a, 16b, 16c, and 16d. GUI 11 may further include display bar 13 and clock display 17 indicating a current time of day. When receiving an input indicating an entry while one of the plurality of selection targets 12, 14a, 14b, 15, 16a, 16b, 16c, and 16d is being selected according to a detection result from touchpad 30, controller 40 executes a specific function corresponding to the selected selection target.

When one of the plurality of selection targets 12 is selected, controller 40 receives this selection as an input of one letter (alphabet) corresponding to this selection target. To be more specific, when receiving an input to selection target 12, controller 40 executes an entry of the letter corresponding to this selection target 12.

Display bar 13 displays the letter that has been entered by controller 40.

When selection target 14a is selected, controller 40 receives this selection as an input to move a cursor leftward. Here, the cursor indicates a position from which a next input of a letter is to be made subsequent to a letter or a letter string currently displayed in display bar 13. When selection target 14b is selected, controller 40 receives this selection as an input to move the cursor rightward from a letter or within a letter string currently displayed in display bar 13. More specifically, when receiving an input to selection target 14a or selection target 14b, controller 40 causes the cursor to move leftward or rightward from a letter or within a letter string currently displayed in display bar 13 according to the received input.

When selection target 15 is selected, controller 40 receives this selection as an input to delete a letter or a letter string currently displayed in display bar 13. Selection target 15 is selected to delete a letter or one letter of a letter string immediately before the cursor displayed in display bar 13, for example. More specifically, selection target 15 is selected to execute a backspace function. To be more specific, when receiving an input to selection target 15, controller 40 deletes a letter or one letter of a letter string immediately before the cursor displayed in display bar 13. Here, a letter or one letter of a letter string immediately before the cursor displayed in display bar 13 is located to the immediate left of the cursor.

Selection targets 16a and 16b are selected to switch the letters corresponding to the plurality of selection targets 12 displayed on GUI 11, which has the keyboard layout displayed on display 50. For example, selection target 16a is selected to switch the plurality of selection targets 12 from the letters to numbers. Selection target 16b is selected to switch the plurality of selection targets 12 from the letters to symbols.

FIG. 4 illustrates a QWERTY keyboard layout displayed on GUI 11 as an example. However, this is not intended to be limiting. Examples of the keyboard layout displayed on GUI 11 include a numeric keyboard layout, such as a ten-key pad, or a Japanese "kana" keyboard layout. After either one of selection targets 16a and 16b is selected and thus highlighted, controller 40 receives an input indicating this entry. As a result of this, the keyboard layout displayed on display 50 is switched to the numeric or symbol keyboard layout. An entry process to highlight a selection target among the plurality of selection targets 12, 14a, 14b, 15, 16a, and 16b is described in detail later.

Next, a gesture operation and a display control operation performed on GUI 11 by controller 40 are specifically described. Here, a gesture operation is also simply referred to as a gesture.

Figure 5:
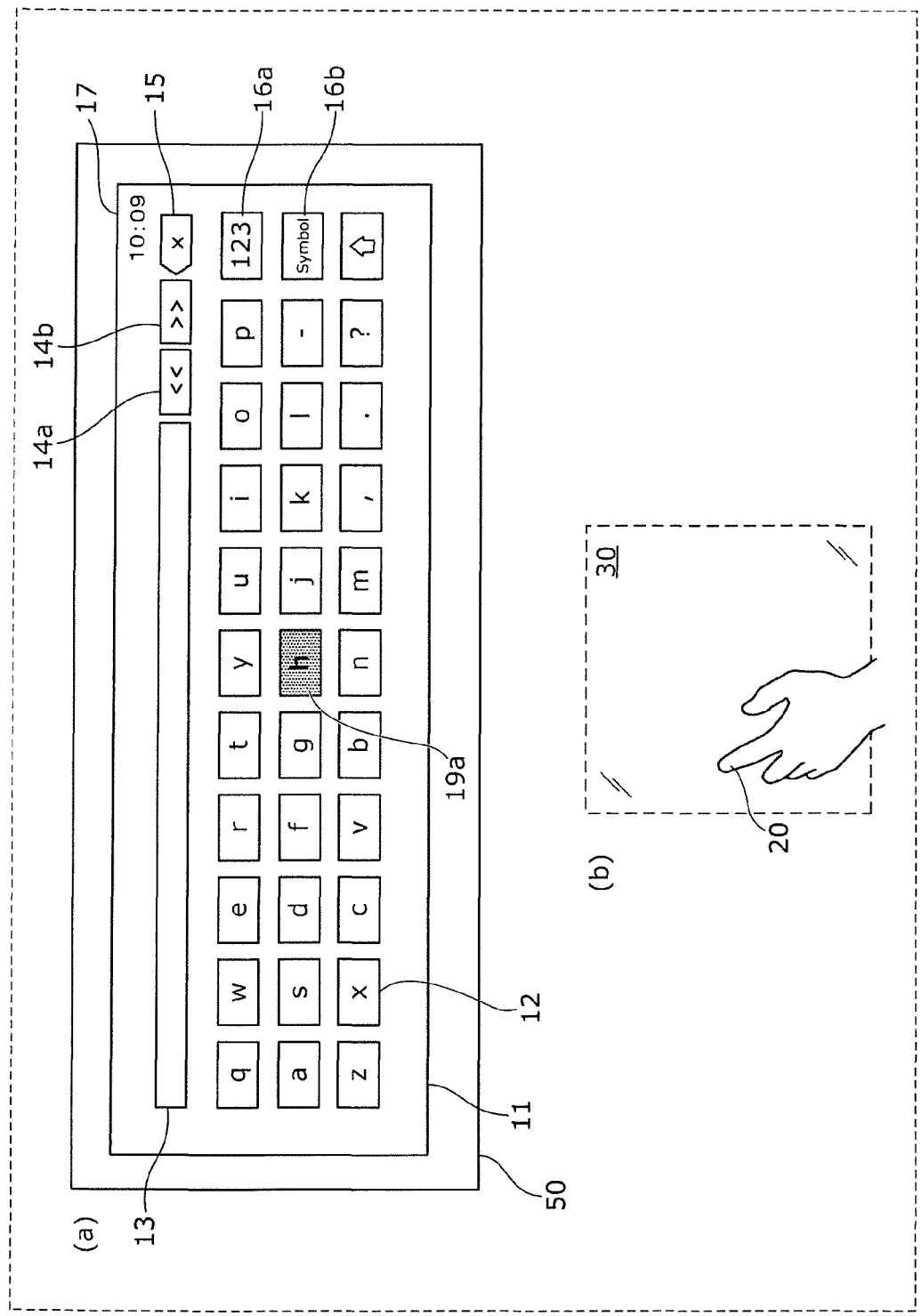
FIG. 5 illustrates an example of a method for making an input to the GUI.
Figure 6:
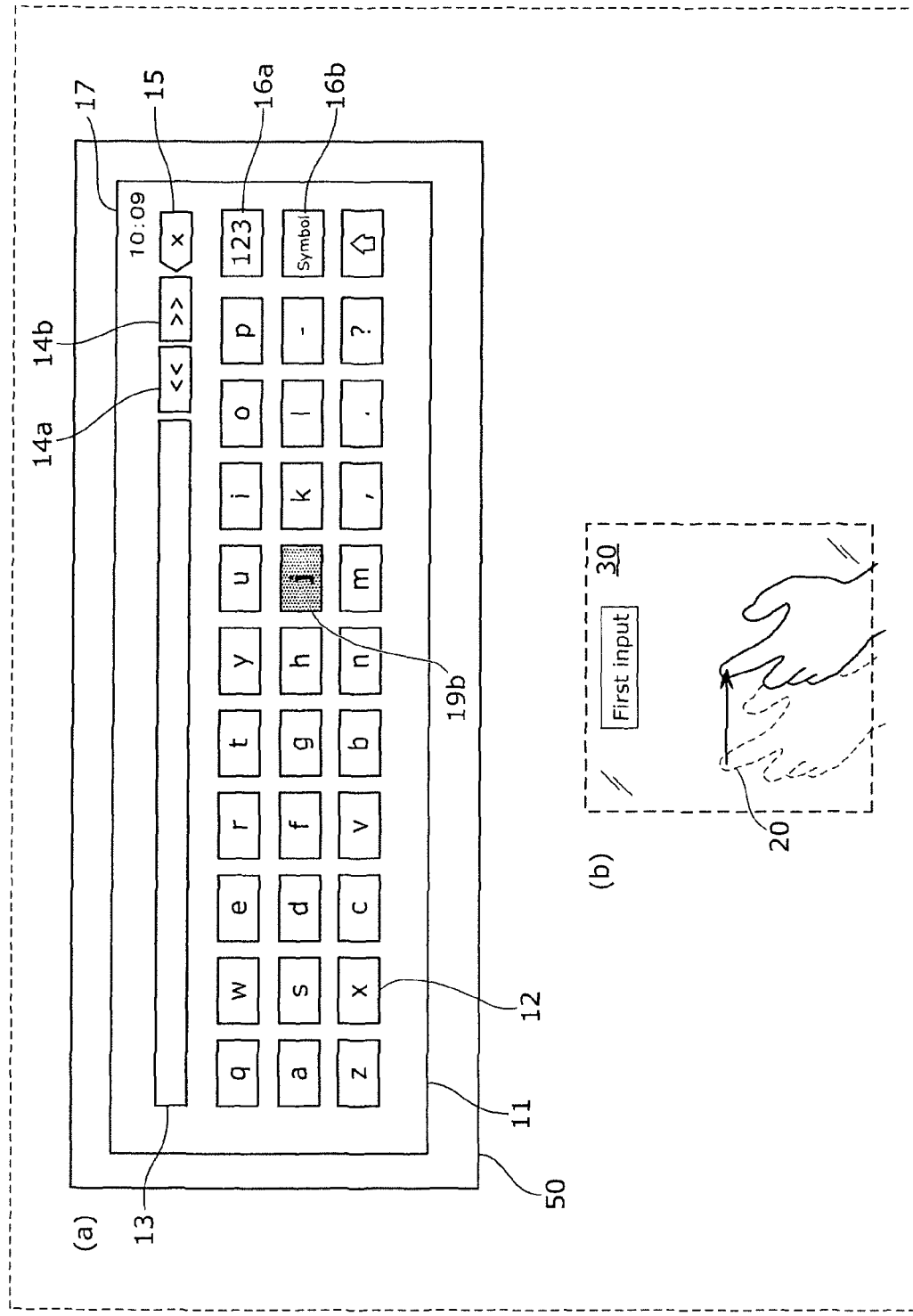
FIG. 6 illustrates an example of a method for making an input to the GUI.

Each of FIG. 5 and FIG. 6 illustrates an example of a method for making an input to the GUI.

Here, (a) of FIG. 5 illustrates a highlight displayed on GUI 11 in response to a touch made on touchpad 30 whereas (b) of FIG. 5 illustrates an input made to touchpad 30.

As illustrated in FIG. 5, controller 40 causes one of the plurality of selection targets 12, 14a, 14b, 15, 16a, and 16b to be highlighted when touch sensor 31 of touchpad 30 detects that operating body 20 comes in contact with operation screen 31a. This highlighted selection target may be a selection target that is predetermined, inputted the last time, or highlighted the last time.

Moreover, this highlighted selection target may be located closest to a position on display 50 corresponding to a position touched by operating body 20 on touchpad 30 if the status of touchpad 30 changes from detecting that operating body 20 is not in contact with touchpad 30 to detecting that operating body 20 is in contact with touchpad 30. In this case, the relationship between the position on display 50 and the corresponding position on touchpad 30 is based on a predetermined correspondence relationship between two planes of coordinates for touchpad 30 and display 50. To be more specific, each set of coordinates on touchpad 30 may be in a one-to-one correspondence with each corresponding set of coordinates on display 50.

For example, highlighting is to: display a selection target, which is to be highlighted, in a color different from a color of the other selection targets; enlarge the selection target to a size larger than the other selection targets; or display a region of the selection target in a bold box. FIG. 5 illustrates an example in which selection target 19a indicating "h" is highlighted on touch sensor 31.

Controller 40 may select the selection target that is currently highlighted. Here, selecting is, once an input for entry is made next, to execute a function corresponding to the selection target that is now being selected. In the example in (a) of FIG. 5 for instance, the input for entry enables controller 40 to receive the input of "h" corresponding to selection target 19a currently highlighted and then to cause the inputted "h" to be displayed on display bar 13.

In FIG. 6, (a) illustrates an example of highlight control performed by controller 40 on GUI 11 when touchpad 30 detects a first input. In FIG. 6, (b) illustrates an example of the first input performed on touchpad 30.

When touch sensor 31 of touchpad 30 detects that an input through first gesture 31 in a predetermined direction (rightward in FIG. 6) is received, controller 40 receives this detected input as the first input. First gesture 31 is described later.

When receiving the first input, controller 40 changes the highlighted selection target from a first selection target, which is highlighted until the first input is received, to a second selection target adjacent to the first selection target in a predetermined direction. For example, when the first input is received while selection target 19a indicating "h" is being highlighted as illustrated in FIG. 5, controller 40 cancels the highlight of selection target 19a and then highlights selection target 19b indicating "j" adjacent to selection target 19a in the rightward direction as illustrated in FIG. 6. Here, if the first input through first gesture 31 performed in an upward direction is received, controller 40 highlights a selection target indicating "y" adjacent to selection target 19a in the upward direction.

Figure 7:
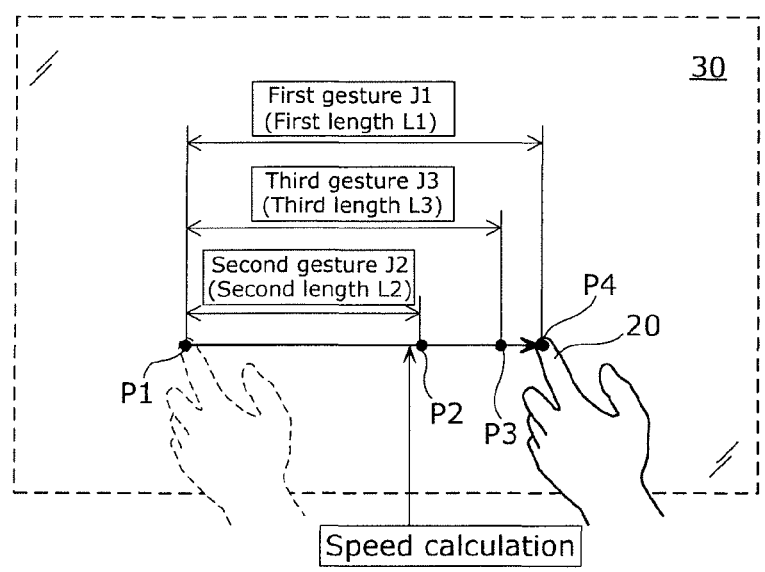
FIG. 7 illustrates a first gesture.
Figure 8:
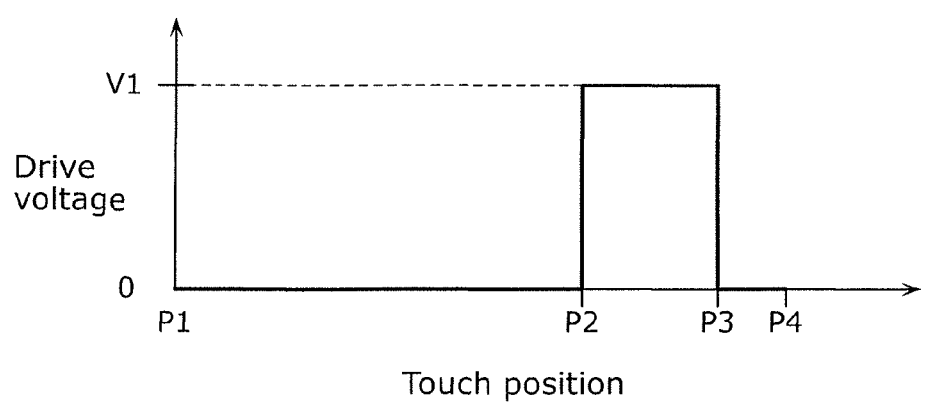
FIG. 8 illustrates activation control performed on a vibrator when the first gesture is inputted.

Next, first gesture 31 and haptic feedback provided when first gesture 31 is inputted are described, with reference to FIG. 7 and FIG. 8. More specifically, the following describes activation control performed on vibrator 33 by controller 40 when first gesture 31 is inputted.

FIG. 7 illustrates first gesture 31. FIG. 8 illustrates activation control performed on vibrator 33 when first gesture 31 is inputted.

When touch sensor 31 of touchpad 30 detects second gesture 32 having second length L2 shorter than first length L1 of first gesture 31 in a predetermined direction from initial position P1, controller 40 activates vibrator 33. To be more specific, when touch sensor 31 detects a gesture operation in which operating body 20 moves from initial position P1 in the predetermined direction and reaches position P2 at a distance of second length L2 from initial position P1, controller 40 applies drive voltage V1 to vibrator 33 as illustrated in FIG. 8. In this way, when touch sensor 31 receives second gesture 32 having a starting point at initial position P1 of first gesture 31, controller 40 activates vibrator 33.

Note that second gesture 32 has the same starting point as first gesture 31 and is shorter than first gesture 31. Thus, before reception of first gesture 31 is completed, second gesture 32 is also received.

When touch sensor 31 of touchpad 30 detects that second gesture 32 extends in a predetermined direction to be third gesture 33 having third length L3 longer than second length L2 and shorter than first length L1, controller 40 deactivates vibrator 33. To be more specific, when touch sensor 31 detects a gesture operation in which operating body 20 moves from initial position P1 in the predetermined direction and reaches position P3 at a distance of third length L3 from position P2, controller 40 applies no drive voltage to vibrator 33 as illustrated in FIG. 8. In this way, when touch sensor 31 receives third gesture 33 having a starting point at initial position P1 of first gesture 31, controller 40 deactivates vibrator 33.

Note that third gesture 33 has the same starting point as first gesture 31 and second gesture 32, and is longer than second gesture 32 and shorter than first gesture 31. Thus, before reception of first gesture 31 is completed, third gesture 33 is also received.

As described, controller 40 provides the haptic feedback while operating body 20 is moving from position P2 to position P3 in first gesture 31. With this haptic feedback provided on operation screen 31a from the completion of second gesture 32 to the completion of third gesture 33, a dynamic friction coefficient of operating body 20 used by the user on operation screen 31a is reduced. The haptic feedback ends at the completion of third gesture 33, and then the reduced friction coefficient returns to the original coefficient. To be more specific, the dynamic friction coefficient increases at the completion of third gesture 33, which causes operating body 20 to move less smoothly on operation screen 31a. Thus, the deactivation of vibrator 33 that results in the increase of the friction coefficient on operation screen 31a acts as a trigger for the user to stop moving operating body 20. Then, the user can easily position operating body 20 at position P4 where the input for first gesture 31 is completed.

Next, a method of determining a drive voltage to be applied to vibrator 33 by controller 40 is described.

Controller 40 determines the drive voltage of vibrator 33 according to a moving speed of operating body 20 in second gesture 32. More specifically, controller 40 calculates a moving speed of operating body 20 at a position immediately before position P2 at which second gesture 32 is completed. The drive voltage to be applied to vibrator 33 decreases as the calculated moving speed increases. As a result, vibrator 33 is activated with small amplitude. Here, the position immediately before position P2 at which second gesture 32 is completed may be a position of operating body 20 detected in an immediately preceding frame located before position P2, for example. The immediately preceding frame is located one to five frames before position P2, for example.

As described, controller 40 determines the drive voltage according to the moving speed of operating body 20 at the position immediately before position P2 in second gesture 32. Here, only if the drive voltage is determined according to the moving speed of operating body 20 in second gesture 32, a moving speed at any position may be used. For example, controller 40 may determine the drive voltage according to a moving speed at a position between a position beyond a halfway point of second gesture 32 and a position at which second gesture 32 is completed.

Controller 40 calculates the moving speed of operating body 20 using an amount of change per unit time in touch position detected by touch sensor 31. Here, the unit time for calculating the moving speed may be a frame rate that is a time interval between a plurality of timings at which a screen of GUI 11 is refreshed on display 50 or may be a sampling cycle detected by touch pad 30 that is a time interval between a plurality of timings.

Figure 9:
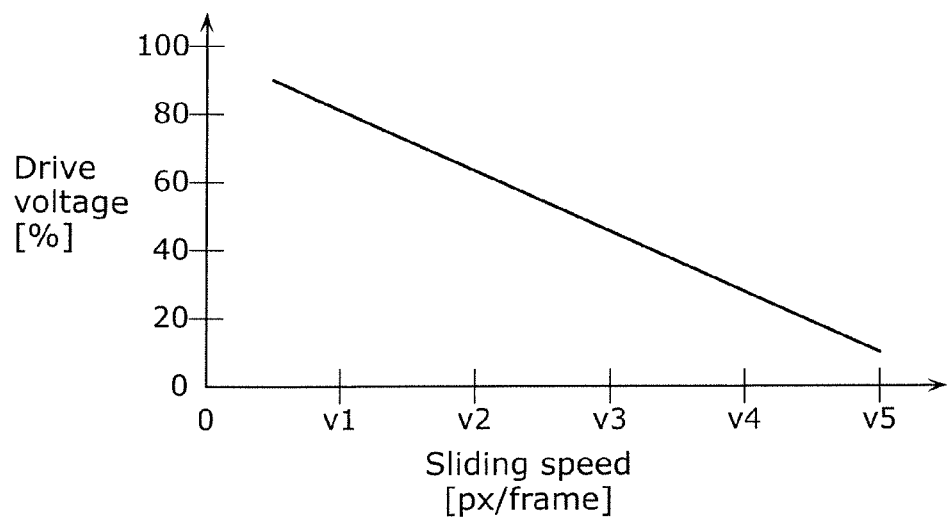
FIG. 9 illustrates an example of a graph showing a first relationship between a drive voltage applied to the vibrator and a sliding speed immediately before the vibrator is activated.

Controller 40 may determine the drive voltage of vibrator 33 that linearly decreases as the moving speed increases as illustrated in FIG. 9 for example. To be more specific, controller 40 activates vibrator 33 with a drive voltage corresponding to the moving speed according to a first relationship, in which the drive voltage decreases as the moving speed increases at a decrease rate that is constant with respect to the increase of the moving speed. FIG. 9 illustrates an example of a graph showing the first relationship between the drive voltage applied to vibrator 33 and the finger sliding speed immediately before vibrator 33 is activated. In FIG. 9, a vertical axis indicates a ratio to a reference drive voltage whereas a horizontal axis indicates a moving speed of operating body 20 in second gesture 32. From the ratio representing the drive voltage in FIG. 9, the drive voltage to be applied can be obtained by multiplying the reference drive voltage by this ratio indicated by a value of 0% to 10%. The reference drive voltage is a fixed value.

In the following, the moving speed is represented by the number of pixels along which operating body 20 moves per unit frame. Here, one pixel is a minimum unit of a two-dimensional position detectable by touch sensor 31.

Figure 10:
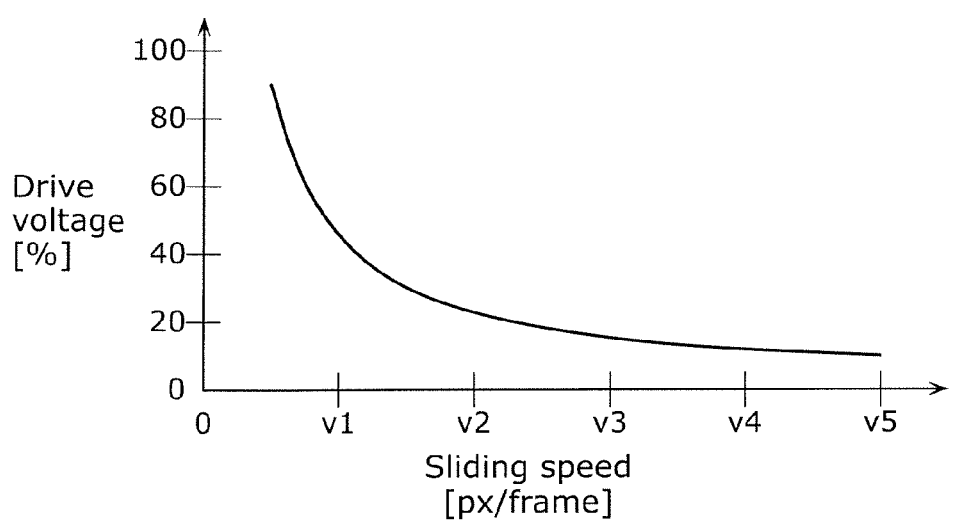
FIG. 10 illustrates an example of a graph showing a second relationship between a drive voltage applied to the vibrator and a sliding speed immediately before the vibrator is activated.

Controller 40 may determine the drive voltage of vibrator 33 that decreases nonlinearly as the moving speed increases, as illustrated in FIG. 10 for example. To be more specific, controller 40 activates vibrator 33 with a drive voltage corresponding to the moving speed according to a second relationship, in which the drive voltage of vibrator 33 decreases as the moving speed increases at a decrease rate that decreases as the moving speed increases. FIG. 10 illustrates an example of a graph showing the second relationship between the drive voltage applied to vibrator 33 and the finger sliding speed immediately before vibrator 33 is activated.

Figure 11:
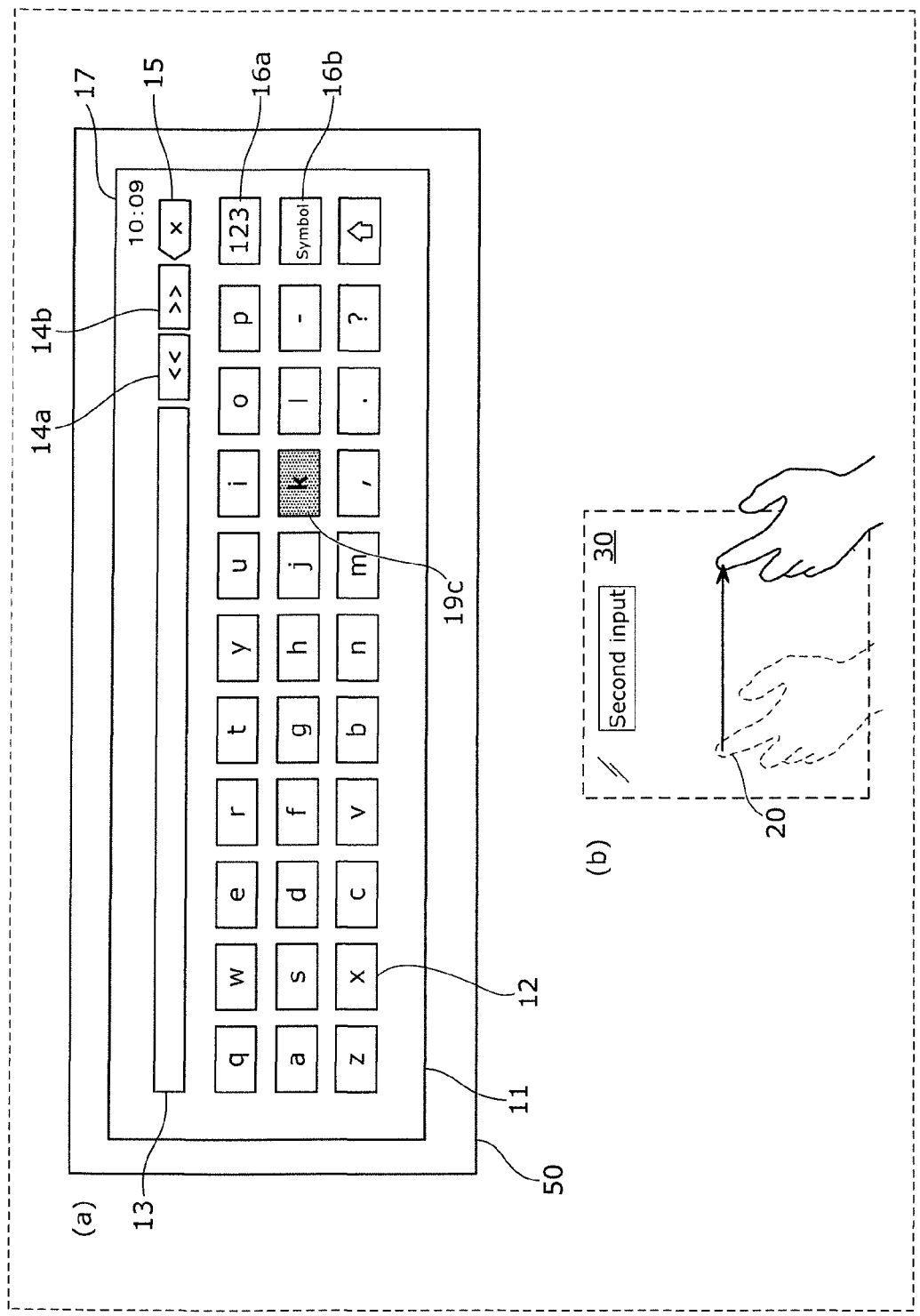
FIG. 11 illustrates an example of an operation performed by the input device according to Embodiment.

In FIG. 11, (a) illustrates an example of highlight control performed by controller 40 on GUI 11 when touchpad 30 detects a second input. In FIG. 11, (b) illustrates an example of the second input performed on touchpad 30.

When touch sensor 31 of touchpad 30 detects that an input through fourth gesture 34 is received, controller 40 receives this detected input as the second input. Fourth gesture 34 is described later.

When receiving the second input, controller 40 changes the highlighted selection target from a first selection target, which is highlighted until the second input is received, to a third selection target adjacent to a second selection target further adjacent to the first selection target in a predetermined direction. For example, when the second input is received while selection target 19a indicating "h" is being highlighted as illustrated in FIG. 5, controller 40 cancels the highlight of selection target 19a and then highlights selection target 19c indicating "k" adjacent to selection target 19b indicating "j" further adjacent to selection target 19a in the rightward direction as illustrated in FIG. 6.

Figure 12:
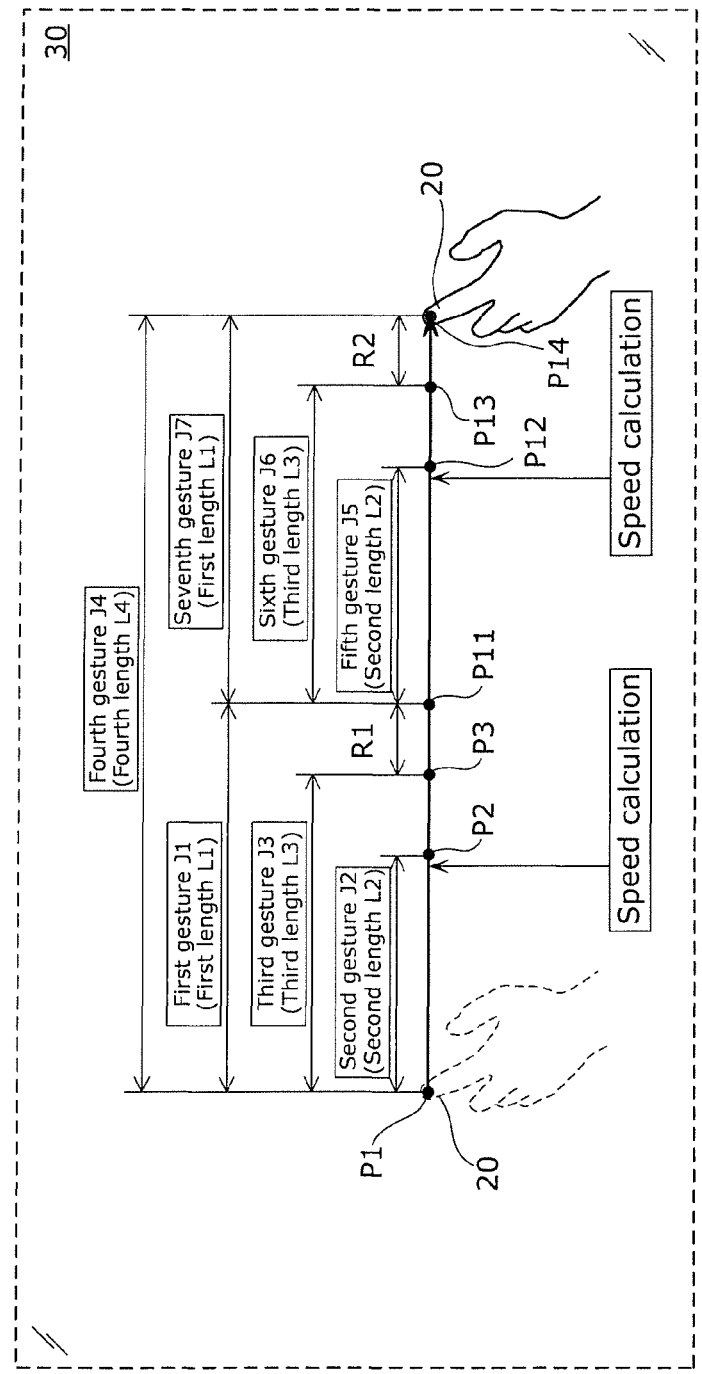
FIG. 12 illustrates a fourth gesture.
Figure 13:
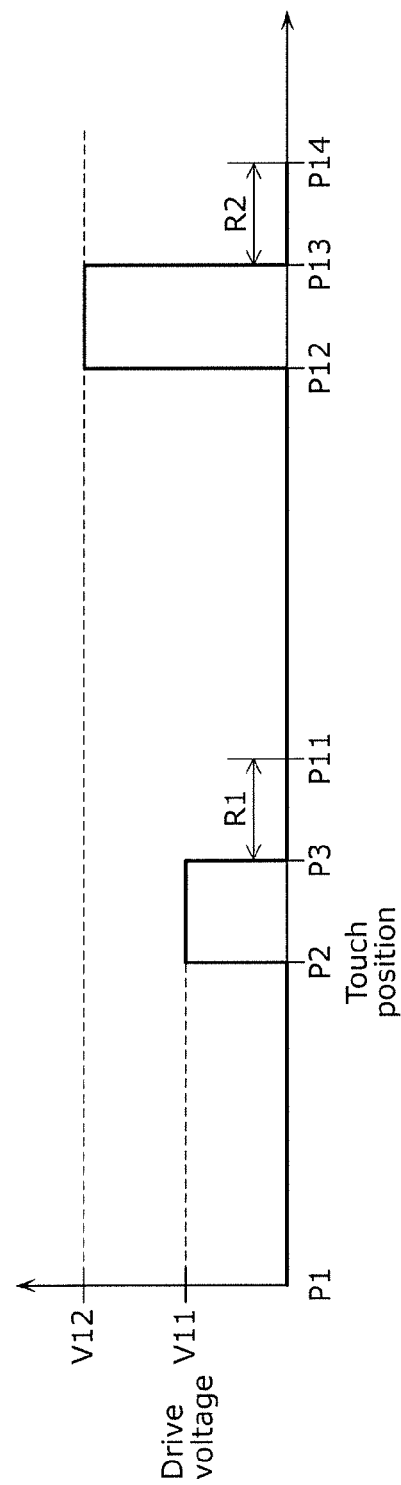
FIG. 13 illustrates activation control performed on the vibrator when the fourth gesture is inputted.

Next, fourth gesture 34 and haptic feedback provided when fourth gesture 34 is inputted are described, with reference to FIG. 12 and FIG. 13. More specifically, the following describes activation control performed on vibrator 33 by controller 40 when fourth gesture 34 is inputted.

FIG. 12 illustrates fourth gesture 34. FIG. 13 illustrates activation control performed on vibrator 33 when fourth gesture 34 is inputted. Note that position P11 in FIG. 12 and FIG. 13 is the same position as position P4 in FIG. 7 and FIG. 8.

The input for first gesture 31 starting from initial position P1 is the same as that described with reference to FIG. 7 and FIG. 8. Here, first gesture 31 may be completed at a position in a range between position P3 and position P11 (hereinafter, this range is referred to as first input range R1). Controller 40 may determine that the gesture is completed if a period during which operating body 20 is in first input range R1 is a predetermined stationary period or more and also if a distance traveled by operating body 20 per unit time is a predetermined distance or less.

To receive a second input different from the first input and to distinguish this second input from first gesture 31, controller 40 receives, as the second input, an input for fourth gesture 34 that further extends beyond first input range R1 in the predetermined direction. Thus, similar to the haptic feedback process that provides the haptic feedback for the first input having the starting point at initial position P1, a haptic feedback process is performed to provide a haptic feedback for the first input having a starting point at position P11 that is the other end away from initial position P1 in first input range R1.

More specifically, suppose that touch sensor 31 of touchpad 30 detects that fifth gesture 35 having second length L2 from position P11 in the predetermined direction is made in fourth gesture 34 extended from first gesture 31 in the predetermined detection. In this case, controller 40 activates vibrator 33. Then, suppose that touch sensor 31 of touchpad 30 detects that fifth gesture 35 extends in the predetermined direction to be sixth gesture 36 having third length L3 from position P11 in the predetermined direction. In this case, controller 40 deactivates vibrator 33.

As described, controller 40 provides the haptic feedback while operating body 20 is moving from position P12 to P13 in fourth gesture 34 extended from first gesture 31. With this haptic feedback provided on operation screen 31a from the completion of fifth gesture 35 to the completion of sixth gesture 36, a dynamic friction coefficient of operating body 20 used by the user on operation screen 31a is reduced. The haptic feedback ends at the completion of sixth gesture 36, and then the reduced friction coefficient returns to the original coefficient. To be more specific, the dynamic friction coefficient increases at the completion of sixth gesture 36, which causes operating body 20 to move less smoothly on operation screen 31a. Thus, the deactivation of vibrator 33 that results in the increase of the friction coefficient on operation screen 31a acts as a trigger for the user to stop moving operating body 20. Then, the user can easily position operating body 20 at position P14 where an input for seventh gesture 37 having a starting point at position P11 is completed.

Here, fourth gesture 34 may be a combination of first gesture 31 and seventh gesture 37 performed in a row.

For fourth gesture 34, haptic feedback is provided twice. More specifically, the haptic feedback is provided firstly for operating body 20 to stop at position P11 where first gesture 31 is completed and then secondly for operating body 20 to stop at position P14 where fourth gesture 34 is completed.

When the haptic feedback is provided twice, a moving speed of operating body 20 is often different for each time. To be more specific, the first haptic feedback is performed with amplitude based on the moving speed of operating body 20 at a position immediately before position P2. Then, the second haptic feedback is performed with amplitude based on the moving speed of operating body 20 at a position immediately before position P12. If intending to perform the second input, the user deliberately makes the gesture longer than the first input. Moreover, position P12 is closer to position P14, at which fourth gesture 34 is completed, than to position P2. This may cause the moving speed of operation instrument 20 passing immediately before position P12 to be slower than the moving speed of operating body 20 passing immediately before position P2.

Controller 40 activates vibrator 33 with the drive voltage determined based on the relationship illustrated in FIG. 9 or FIG. 10. As a result of this, drive voltage V11 for the first haptic feedback may be smaller than drive voltage V12 for the second haptic feedback. In other words, the amplitude for the first haptic feedback can be made smaller than the amplitude for the second haptic feedback. This allows the user to feel a relatively large friction from the first haptic feedback and a relatively small friction from the second haptic feedback. Due to a relatively small difference of the friction for the first haptic feedback, a brake on operating body 20 felt by the user is also small. In contrast, due to a relatively large difference of the friction for the second haptic feedback, a brake on operating body 20 felt by the user is also large. The brake larger in the second haptic feedback than in the first haptic feedback enables the user to easily make the second input to touch sensor 31 through fourth gesture 34.

[3. Operation]

Next, an operation performed by input device 10 is described with reference to FIG. 14 and FIG. 15.

Figure 14:
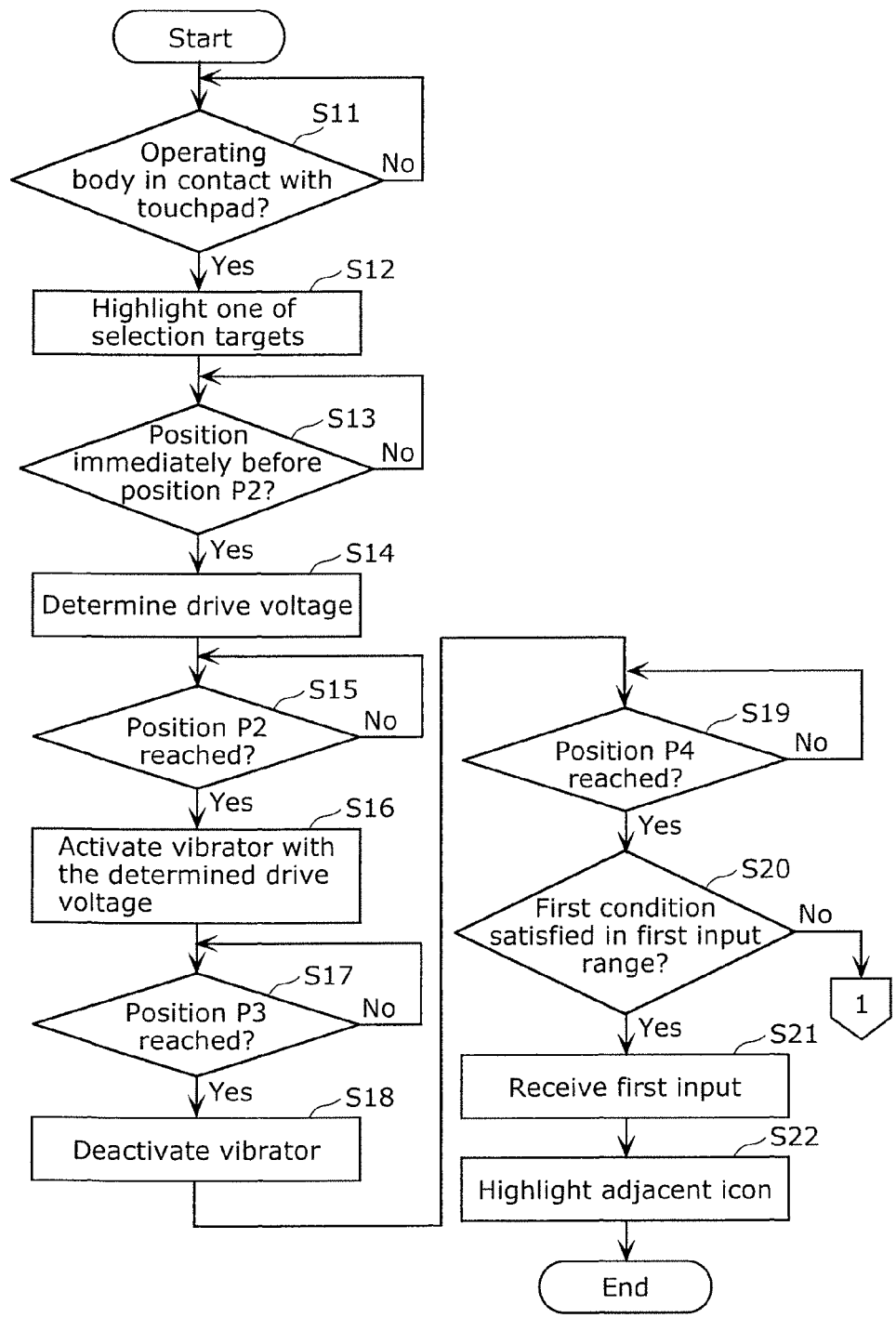
FIG. 14 is a flowchart illustrating an example of an operation performed by the input device according to Embodiment.
Figure 15:
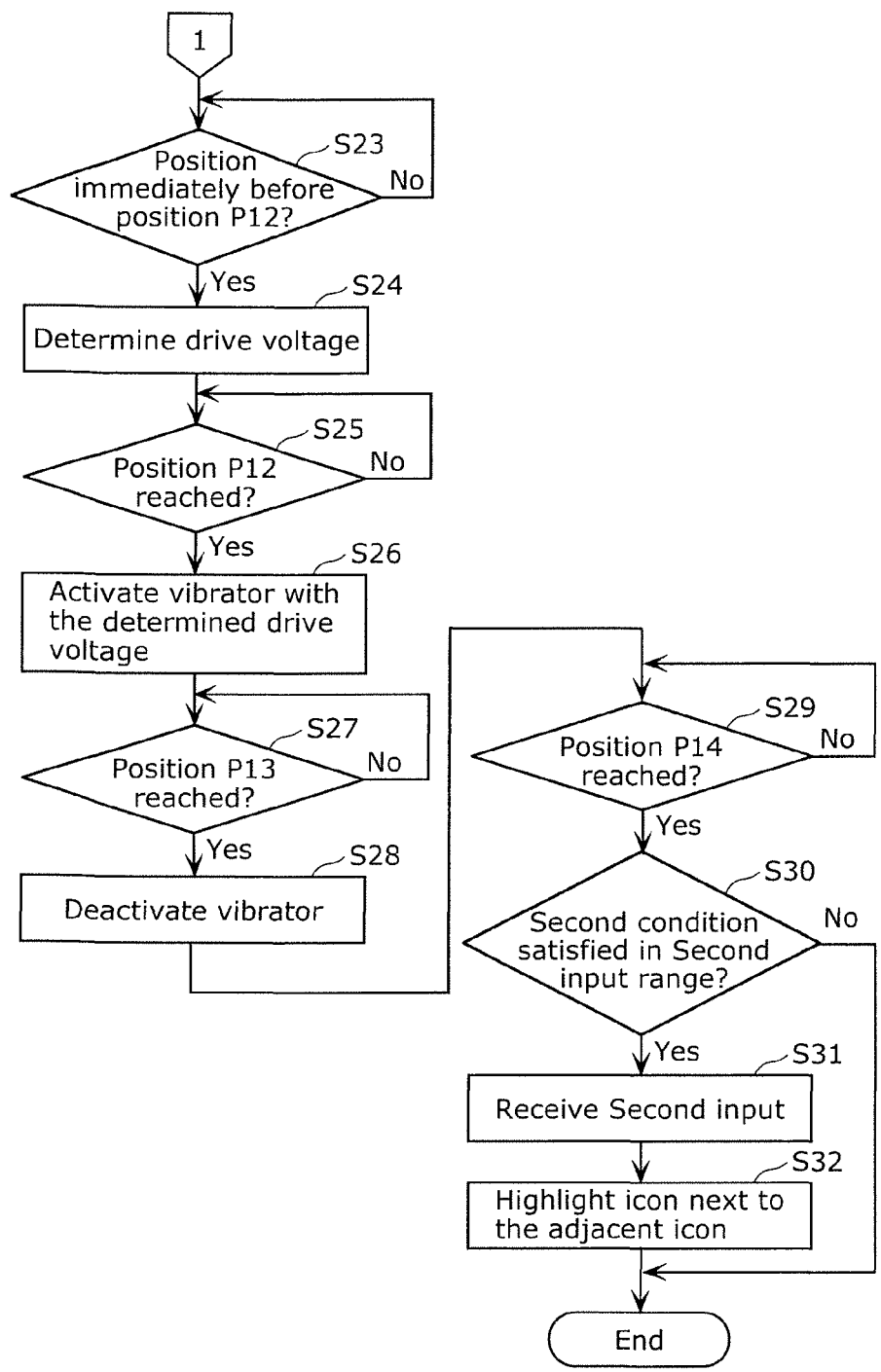
FIG. 15 is a flowchart illustrating an example of an operation performed by the input device according to Embodiment.

Each of FIG. 14 and FIG. 15 is a flowchart illustrating an example of the operation performed by the input device according to Embodiment.

Controller 40 determines whether operating body 20 is in contact with touchpad 30, in accordance with a signal from touchpad 30 (S11). The signal from touchpad 30 is an input signal indicating an input made to touch sensor 31 or pressure sensor 32 of touchpad 30. The input operation performed on pressure sensor 32 has been described with reference to FIG. 2 and thus is omitted from the description on the operations illustrated in FIG. 14 and FIG. 15.

If determining that operating body 20 is in contact with touchpad 30 (Yes in S11), controller 40 highlights one of the plurality of selection targets 12, 14a, 14b, 15, 16a, and 16b (S12).

If determining that operating body 20 is not in contact with touchpad 30 (No in S11), controller 40 returns to Step S11.

Controller 40 determines whether operating body 20 has reached a position immediately before position P2 at the distance of second length L2 in the predetermined direction from initial position P1 touched by operating body 20 in Step S11 (S13).

If determining that operating body 20 has reached the position immediately before position P2 (Yes in S13), controller 40 calculates a moving speed of operating body 20 at this position immediately before position P2 and then determines the drive voltage according to the calculated moving speed and the first or second relationship (S14). In contrast, if determining that operating body 20 has not reached the position immediately before position P2 (No in S13), controller 40 returns to Step S13.

After determining the drive voltage, controller 40 determines whether operating body 20 has reached position P2 (S15).

If determining that operating body 20 has reached position P2 (Yes in S15), controller 40 activates vibrator 33 with the determined drive voltage (S16). In contrast, if determining that operating body 20 has not reached position P2 (No in S15), controller 40 returns to Step S15.

After activating vibrator 33, controller 40 determines whether operating body 20 has reached position P3 (S17).

If determining that operating body 20 has reached position P3 (Yes in S17), controller 40 deactivates vibrator 33 (S18). In contrast, if determining that operating body 20 has not reached position P3 (No in S17), controller 40 returns to Step S17.

After deactivating driving vibrator 33, controller 40 determines whether operating body 20 has reached position P4 (S19).

If determining that operating body 20 has reached position P4 (Yes in S19), controller 40 determines whether a first condition is satisfied in first input range R1 (S20). For example, the first condition is that: an entry for the first input is made; or that the period during which operating body 20 is in first input range R1 is the predetermined stationary period or more and also the distance traveled by operating body 20 per unit time is the predetermined distance or less. In contrast, if determining that operating body 20 has not reached position P4 (No in S19), controller 40 returns to Step S19.

If determining that the first condition is satisfied in first input range R1 (Yes in S20), controller 40 receives the first input (S21). Following this, controller 40 changes the currently-highlighted selection target to a selection target adjacent to this currently-highlighted selection target in the predetermined direction (S22). Then, controller 40 ends the operation.

In contrast, if determining that the first condition is not satisfied in first input range R1 (No in S20), controller 40 determines that first gesture 31 is further extended. Thus, controller 40 determines whether operating body 20 has reached a position immediately before position P12 (S23).

If determining that operating body 20 has reached the position immediately before position P12 (Yes in S23), controller 40 calculates a moving speed of operating body 20 at this position immediately before position P12 and then determines the drive voltage according to the calculated moving speed and the first or second relationship (S24). In contrast, if determining that operating body 20 has not reached the position immediately before position P12 (No in S23), controller 40 returns to Step S23.

After determining the drive voltage, controller 40 determines whether operating body 20 has reached position P12 (S25).

If determining that operating body 20 has reached position P12 (Yes in S25), controller 40 activates vibrator 33 with the determined drive voltage (S26). In contrast, if determining that operating body 20 has not reached position P12 (No in S25), controller 40 returns to Step S25.

After activating vibrator 33, controller 40 determines whether operating body 20 has reached position P13 (S27).

If determining that operating body 20 has reached position P13 (Yes in S27), controller 40 deactivates vibrator 33 (S28). In contrast, if determining that operating body 20 has not reached position P13 (No in S27), controller 40 returns to Step S27.

After deactivating driving vibrator 33, controller 40 determines whether operating body 20 has reached position P14 (S29).

If determining that operating body 20 has reached position P14 (Yes in S29), controller 40 determines whether a second condition is satisfied in second input range R2 (S30). For example, the second condition is that: an entry for the second input is made; or that the period during which operating body 20 is in second input range R2 is a predetermined stationary period or more and also the distance traveled by operating body 20 per unit time is a predetermined distance or less. In contrast, if determining that operating body 20 has not reached position P14 (No in S29), controller 40 returns to Step S29.

If determining that the second condition is satisfied in second input range R2 (Yes in S30), controller 40 receives the second input (S31). Following this, controller 40 changes the currently-highlighted selection target to a selection target adjacent to this currently-highlighted selection target in the predetermined direction (S32). Then, controller 40 ends the operation.

In contrast, if determining that the second condition is not satisfied in second input range R2 (No in S30), controller 40 may determine that an input for cancellation has been made and thus end the operation. In this case, controller 40 may determine that fourth gesture 34 is further extended and perform processes similar to Steps S23 to S32 in the predetermined direction beyond a section in which the second input is made. To be more specific, controller 40 may perform an operation for the third input that is made next. In this way, whenever the gesture is extended beyond the first input in the predetermined direction, an operation for a different input may be performed.

Here, after determining "Yes" in Step S11, controller 40 determines whether operating body 20 has been lifted from touchpad 30. If determining that operating body 20 has been lifted from touchpad 30, controller 40 may cancel the input. Moreover, if operating body 20 comes in contact with touchpad 30 again within a predetermined period of time after being lifted from touchpad 30, controller 40 may resume the operation as a continuation of the input performed up to the position at which operating body 20 was lifted from touchpad 30.

[4. Advantageous Effects Etc.]

Input device 10 according to Embodiment includes touch sensor 31, vibrator 33 and controller 40. Touch sensor detects a touch position touched by operating body 20 on operation screen 31a. Vibrator 33 is activated in an ultrasonic band to provide haptic feedback on operation screen 31a. Controller 40 is electrically connected to touch sensor 31 and vibrator 33. Controller 40 receives, as a first input, an input made to touch sensor 31 through first gesture 31 in a predetermined direction. Controller 40 activates vibrator 33 when touch sensor 31 receives second gesture 32 having second length L2 shorter than first length L1 of first gesture 31 in the predetermined direction from an initial position of first gesture 31. Controller 40 deactivates vibrator 33 when touch sensor 31 receives third gesture 33 having third length L3 longer than second length L2 and shorter than first length L1 in the predetermined direction from the initial position.

With this, vibrator 33 is deactivated in first gesture 31 when third gesture 33 is received. Thus, vibrator 33 can be deactivated before the finger reaches a position at which first gesture 31 is completed. In other words, vibrator 33 is deactivated at a position before the finger reaches, from a previous target region, the peripheral region of the target, so that friction on the finger increases. Thus, the deactivation of vibrator 33 that results in the increase of the friction coefficient on operation screen 31a acts as a trigger for the user to stop moving operating body 20. Then, the user can easily position operating body 20 at the position where the input for first gesture 31 is completed. This allows the user to easily make an input (the first input) to touch sensor 31 through the gesture (the first gesture) having a length as intended.

Controller 40 of input device 10 according to Embodiment receives, as a second input different from the first input, an input made through a gesture having a length exceeding first length L1 in the predetermined direction from initial position P1.

Thus, a haptic feedback felt by counting the number of times that the friction coefficient changes enables the user to know that the operating body moves beyond a range of the first gesture and reaches a range in which an input for a different gesture is made. This allows the user to easily position the operating body at a position where the different gesture is completed. Thus, the user can easily make a different input to the touch sensor through the different gesture.

Controller 40 of input device 10 according to Embodiment further (i) calculates a moving speed of operating body 20 in second gesture 32 using an amount of change per unit time in the touch position detected by touch sensor 31, and (ii) activates vibrator 33 with amplitude that decreases as the calculated moving speed increases.

For the second input through fourth gesture 34 made by the user, first haptic feedback with amplitude greater than predetermined amplitude between second gesture 32 and third gesture 33 causes a friction coefficient during the haptic feedback to be smaller than a predetermined friction coefficient. Thus, if the haptic feedback stops, an increase in the friction coefficient between before and after the haptic feedback is greater than a predetermined value. This applies a stronger brake to operating body 20 in a region through which operating body 20 is to pass. Thus, when the user performs the second input through fourth gesture 34, a strong brake by the haptic feedback provided before the second haptic feedback corresponding to the completion of fourth gesture 34 interferes a smooth input of fourth gesture 34.

Here, when the user performs the second input through fourth gesture 34, a moving speed of operating body 20 for second gesture 32 is assumed to be faster than a predetermined speed. On this account, vibrator 33 is activated with a drive voltage that decreases as the moving speed increases, so that vibration amplitude of vibrator 33 is reduced for the first haptic feedback. As a result, the increase of the friction coefficient can be reduced when the user makes fourth gesture 34. This enhances the accuracy of predicting that the user may perform fourth gesture 34, and also reduces the brake caused by the haptic feedback to operating body 20 in fourth gesture 34 of the user. Thus, the second input through fourth gesture 34 can be performed smoothly.

Controller 40 of input device 10 according to Embodiment activates vibrator 33 with the drive voltage corresponding to the moving speed according to a first relationship in which the drive voltage of vibrator 33 decreases as the moving speed increases at a decrease rate that is constant with respect to the increase of the moving speed. This enables vibrator 33 to be easily activated with amplitude that decreases as the moving speed of operating body 20 increases.

Controller 40 of input device 10 according to Embodiment activates vibrator 33 with the drive voltage corresponding to the moving speed according to a second relationship in which the drive voltage of vibrator 33 decreases as the moving speed increases at a decrease rate that decreases as the moving speed increases. Thus, an amplitude decrease rate can be reduced in a region in which the moving speed of operating body 20 is faster than a predetermined speed as compared to a region in which the moving speed of operating body 20 is slower than the predetermined speed.

[5. Variations]

(1)

In Embodiment described above, controller 40 determines the drive voltage of vibrator 33 according to the moving speed of operating body 20 in second gesture 32. However, controller 40 may determine the drive voltage according to the moving speed and a touch load of operating body 20 in second gesture 32. In this case, controller 40 calculates the moving speed of operating body 20 at a position immediately before position P2 at which second gesture 32 is completed. Then, controller 40 activates vibrator 33 with a drive voltage that decreases as the calculated moving speed increases and that also decreases as the touch load obtained from pressure sensor 32 in second gesture 32 decreases. As a result, vibrator 33 is activated with small amplitude.

Here, when the user performs the second input through fourth gesture 34, a moving speed of operating body 20 for second gesture 32 is assumed to be faster than a predetermined speed and also a touch load in second gesture 32 is assumed to be smaller than a predetermined load. On this account, vibrator 33 is activated with a drive voltage that decreases as the moving speed increases and that also decreases as the touch load decreases, so that vibration amplitude of vibrator 33 is reduced for the haptic feedback provided between second gesture 32 and third gesture 33. As a result, the increase of the friction coefficient can be reduced when the user makes fourth gesture 34. This enhances the accuracy of predicting that the user may perform fourth gesture 34 and also reduces the brake caused by the haptic feedback to operating body 20 in fourth gesture 34. Thus, the second input through fourth gesture 34 can be performed smoothly.

Figure 16:
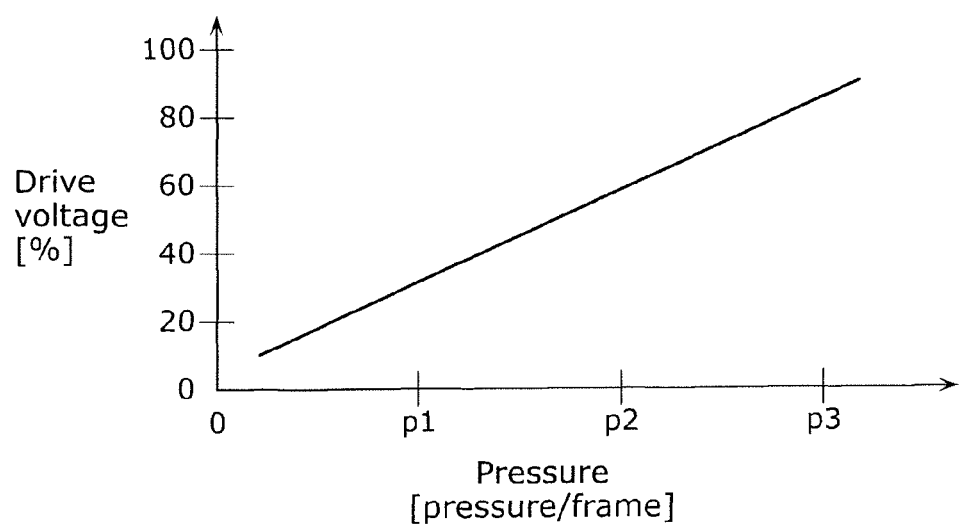
FIG. 16 illustrates an example of a graph showing a third relationship between a drive voltage applied to the vibrator and a touch load immediately before the vibrator is activated.

For example, controller 40 may determine the drive voltage of vibrator 33 that linearly decreases as the moving speed increases as illustrated in FIG. 9 and that also linearly decreases as the touch load decreases as illustrated in FIG. 16. More specifically, controller 40 activates vibrator 33 according to the first relationship and a third relationship in which the drive voltage decreases as the touch load decreases at a decrease rate that is constant with respect to the decrease of the touch load. That is, controller 40 activates vibrator 33 with the drive voltage that corresponds to the moving speed in the first relationship and to the touch load in the third relationship. To be more specific, controller 40 calculates a first ratio to the drive voltage corresponding to the moving speed in the first relationship, that is, a first ratio to a reference drive voltage. Controller 40 also calculates a third ratio to the drive voltage corresponding to the touch load in the third relationship, that is, a third ratio to the reference drive voltage. Then, controller 40 determines the drive voltage of vibrator 33 by multiplying the reference drive voltage by the first and third ratios. As a result, vibrator 33 can be easily activated with the drive voltage that decreases as the moving speed of operating body 20 increases and that also decreases as the touch load decreases.

FIG. 16 illustrates an example of a graph showing the third relationship between the drive voltage applied to vibrator 33 and the touch load immediately before vibrator 33 is activated. In FIG. 16, a vertical axis indicates a ratio to the reference drive voltage whereas a horizontal axis indicates a moving speed of operating body 20 in second gesture 32.

Figure 17:
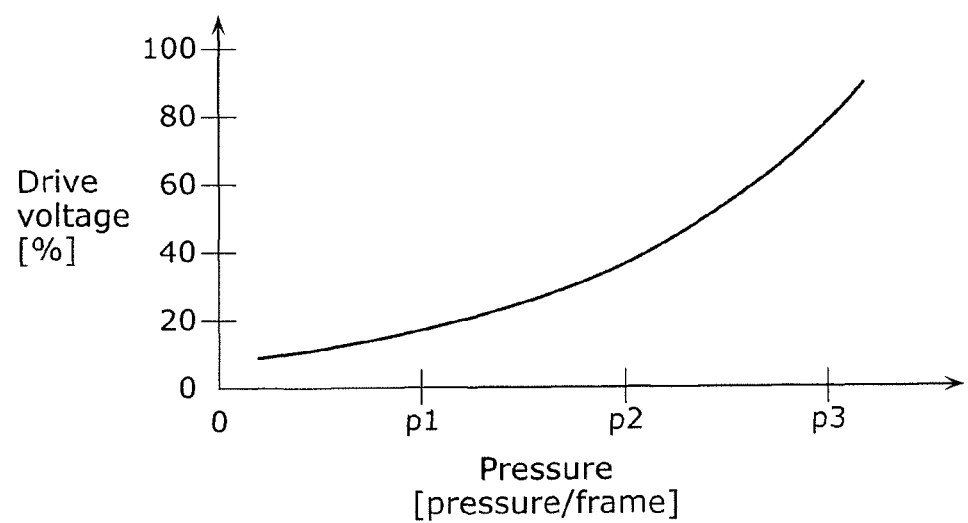
FIG. 17 illustrates an example of a graph showing a fourth relationship between a drive voltage applied to the vibrator and a touch load immediately before the vibrator is activated.

For example, controller 40 may determine the drive voltage of vibrator 33 that decreases nonlinearly as the moving speed increases as illustrated in FIG. 10 and that also decreases nonlinearly as the touch load increases as illustrated in FIG. 17. To be more specific, controller 40 activates vibrator 33 according to the second relationship and a fourth relationship in which the drive voltage of vibrator 33 decreases as the touch load decreases at a decrease rate that decreases as the touch load decreases. That is, controller 40 activates vibrator 33 with the drive voltage corresponding to the moving speed in the second relationship and to the touch load in the fourth relationship. To be more specific, controller 40 calculates a second ratio to the drive voltage corresponding to the moving speed in the second relationship, that is, a second ratio to a reference drive voltage. Controller 40 also calculates a fourth ratio to the drive voltage corresponding to the touch load in the fourth relationship, that is, a third ratio to the reference drive voltage. Then, controller 40 determines the drive voltage of vibrator 33 by multiplying the reference drive voltage by the second and fourth ratios. As a result, an amplitude decrease rate can be reduced in a region in which the moving speed of operating body 20 is faster than a predetermined speed as compared to a region in which the moving speed of operating body 20 is slower than the predetermined speed. Moreover, the amplitude decrease rate can be reduced in a region in which the touch load is smaller than a predetermined load as compared to a region in which the touch load is larger than the predetermined load.

FIG. 17 illustrates an example of a graph showing the fourth relationship between the drive voltage applied to vibrator 33 and the touch load immediately before vibrator 33 is activated. In FIG. 17, a vertical axis indicates a ratio to the reference drive voltage whereas a horizontal axis indicates a moving speed of operating body 20 in second gesture 32.

Note that controller 40 may determine the drive voltage by calculating the first and fourth ratios and then multiplying the reference drive voltage by the calculated first and fourth ratios. Note also that controller 40 may determine the drive voltage by calculating the second and third ratios and then multiplying the reference drive voltage by the calculated second and third ratios.

Here, if Variation (1) is not applied in Embodiment described above, touchpad 30 may not include pressure sensor 32.

(2)

In Embodiment described above, if operating body 20 stops in a range between first input range R1, in which first gesture 31 is completed, and second input range R2, an input for cancellation can be made. More specifically, if a gesture having a length exceeding first input range R1 but not reaching second input range R2 is made, this gesture may be received as an input different from the first input.

(3)

In Embodiment described above, controller 40 may change first length L1, second length L2, and third length L3 for specifying first gesture 31 to seventh gesture 37 according to a UI displayed on display 50. More specifically, if display 50 displays GUI 11 including a keyboard layout for alphabets, controller 40 may set each length of first gesture 31 to seventh gesture 37 to control haptic feedback appropriate to the keyboard layout for alphabets. If display 50 displays GUI 11 including a keyboard layout for numerics, controller 40 may set each length of first gesture 31 to seventh gesture 37 to control haptic feedback appropriate to the keyboard layout for numerics. To be more specific, lengths L1 to L4 for specifying gestures 31 to 37 on a first UI among a plurality of UIs may be different from lengths L1 to L4 for specifying gestures 31 to 37 on a second UI among the plurality of UIs.

A specific description is as follows.

For example, controller 40 may change first length L1, second length L2, and third length L3, in accordance with at least one of: a size of one selection target of a plurality of selection targets included in a GUI displayed on display 50; the total number of the plurality of selection targets; or a distance between the plurality of selection targets. In this case, reference lengths to be changed are first length L1, second length L2, and third length L3 used for GUI 11 described in Embodiment. However, this is not intended to be limiting. The reference lengths may be predetermined first to third lengths. Relationships among these predetermined first to third lengths are the same as those among first length L1, second length L2, and third length L3. More specifically, the predetermined first length is longer than the predetermined third length, and the predetermined third length is longer than the predetermined second length.

In this case, first length L1, second length L2, and third length L3 for specifying first gesture 31 to seventh gesture 37 are variable depending on a displayed status of the plurality of selection targets included in the GUI displayed on display 50. Thus, the accuracy of guiding operating body 20 (the finger of the user) to a position on touchpad 30 corresponding to a desired position on the GUI is increased. This allows the user to easily make an input to touch sensor 31 through the gesture having a length as intended.

A specific description is as follows.

Figure 18:
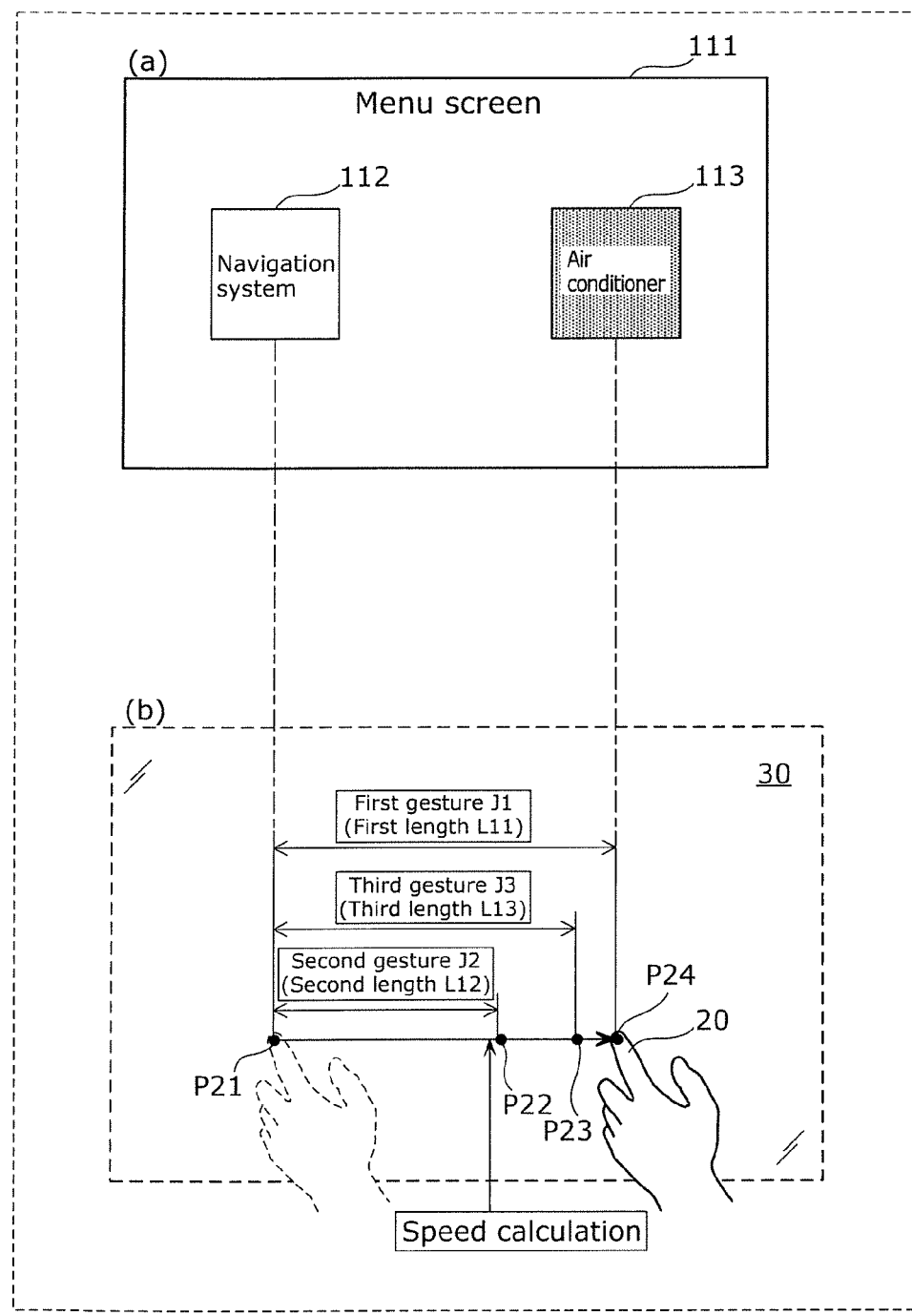
FIG. 18 illustrates another example of a method for making an input to the GUI.

FIG. 18 illustrates another example of the method for making an input to the GUI.

In FIG. 18, (a) illustrates an example of GUI 111 whereas (b) illustrates an example of making an input to touchpad 30. Unlike the GUI in FIG. 4, GUI 111 displayed on display 50 includes two selection targets 112 and 113 corresponding respectively to a navigation system and an air conditioner. Each of these two selection targets is selected to execute an application for controlling an operation of the device corresponding to the selection target. More specifically, GUI 111 is a menu screen. As compared to GUI 11, GUI 111 is an example having: selection targets displayed in larger size; a less number of selection targets; and a longer distance between selection targets.

First, suppose that, to select selection target 113, an input for first gesture 31 is made from initial position P21 corresponding to selection target 112 on touchpad 30 toward position P24 corresponding to selection target 113 on touchpad 30. In this case, controller 40 may change first length L1, second length L2, and third length L3 by increasing these lengths as selection target 112 or 113 increases in size. More specifically, controller 40 sets first length L11, which is longer than first length L1, as the first length for specifying first gesture 31. Similarly, controller 40 sets second length L12, which is longer than second length L2, as the second length for specifying second gesture 32. Similarly, controller 40 sets third length L13, which is longer than third length L3, as the third length for specifying third gesture 33. Here, second length L12 is longer than first length L11. Moreover, third length L13 is longer than second length L12 and shorter than first length L11.

Thus, position P22 at which the input for second gesture 32 is completed is at a distance of second length L12 from initial position P21 in a predetermined direction (rightward in FIG. 18). Similarly, a position at which the input for third gesture 33 is completed is at a distance of third length L13 from initial position P21 in the predetermined direction.

Thus, controller 40 increases first length L11, second length L12, and third length L13 as selection target 112 or 113 increases in size. This allows the user to feel an increase of friction on the finger of the user soon after the finger reaches a region corresponding to selection target 112 or 113 on touchpad 30. As a result, the accuracy of guiding the finger of the user to a position on touchpad 30 corresponding to a desired position on GUI 111 is increased. This allows the user to easily make an input to touch sensor 31 through the gesture having a length as intended.

Moreover, controller 40 may change first length L1, second length L2, and third length L3 by reducing these lengths as the total number of selection targets increases. The number of selection targets included in GUI 111 is smaller than that included in GUI 11. Thus, controller 40 may set a longer length for each of first length L11, second length L12, and third length L13 as compared to those lengths for GUI 11.

Thus, similarly to the process of increasing the lengths of gestures 31 to 33 as the selection target increases in size, controller 40 increases the lengths of gestures 31 to 33 as the total number of selection targets included in the GUI decreases. Moreover, the number of selection targets included in GUI 11 is larger than that included in GUI 111. Thus, controller 40 sets a shorter length for each of first length L1, second length L2, and third length L3 as compared to those lengths for GUI 111. This allows the user to feel an increase of friction on the finger, differently for each of multiple selection targets. As a result, the accuracy of guiding the finger of the user to a position on touchpad 30 corresponding to a desired position on GUI 111 is increased. This allows the user to easily make an input to touch sensor 31 through the gesture having a length as intended.

Furthermore, controller 40 may change first length L1, second length L2, and third length L3 by increasing these lengths as the distance between the selection targets increases. The distance between selection targets in GUI 111 is larger than that in GUI 11. Thus, controller 40 may set a longer length for each of first length L11, second length L12, and third length L13 as compared to those lengths for GUI 11.

Thus, controller 40 increases the lengths of gestures 31 to 33 as the distance between selection targets increases. This allows the user to feel an increase of friction on the finger soon after the finger, which has traveled a long distance, reaches a region corresponding to selection target 112 or 113 on touchpad 30. As a result, the accuracy of guiding the finger to a position on touchpad 30 corresponding to a desired position on GUI 111 is increased. This allows the user to easily make an input to touch sensor 31 through the gesture having a length as intended.

FIG. 18 illustrates an example in which controller 40 changes first length L1, second length L2, and third length L3 in accordance with at least one of size, total number, or distance of selection targets. However, controller 40 may change the lengths in accordance with these in combination. In this case for example, controller 40 may set a greater coefficient for each of reference lengths of gestures 31 to 33: as the size of selection target increases; as the total number of selection targets included in the GUI decreases; and the distance between selection targets included in the GUI increases. Then, a length obtained by multiplying at least two of the calculated coefficients by the reference length of the gesture may be used as the length of the gesture. For example, controller 40 may set a coefficient greater than 1 for a length longer than the reference length, and set a coefficient smaller than 1 for a length shorter than the reference length.

(4)

In Embodiment described above, controller 40 may change first length L1, second length L2, and third length L3 in accordance with a direction in which operating body 20 (the finger of the user) moves on operation screen 31a of touch sensor 31.

Figure 19:
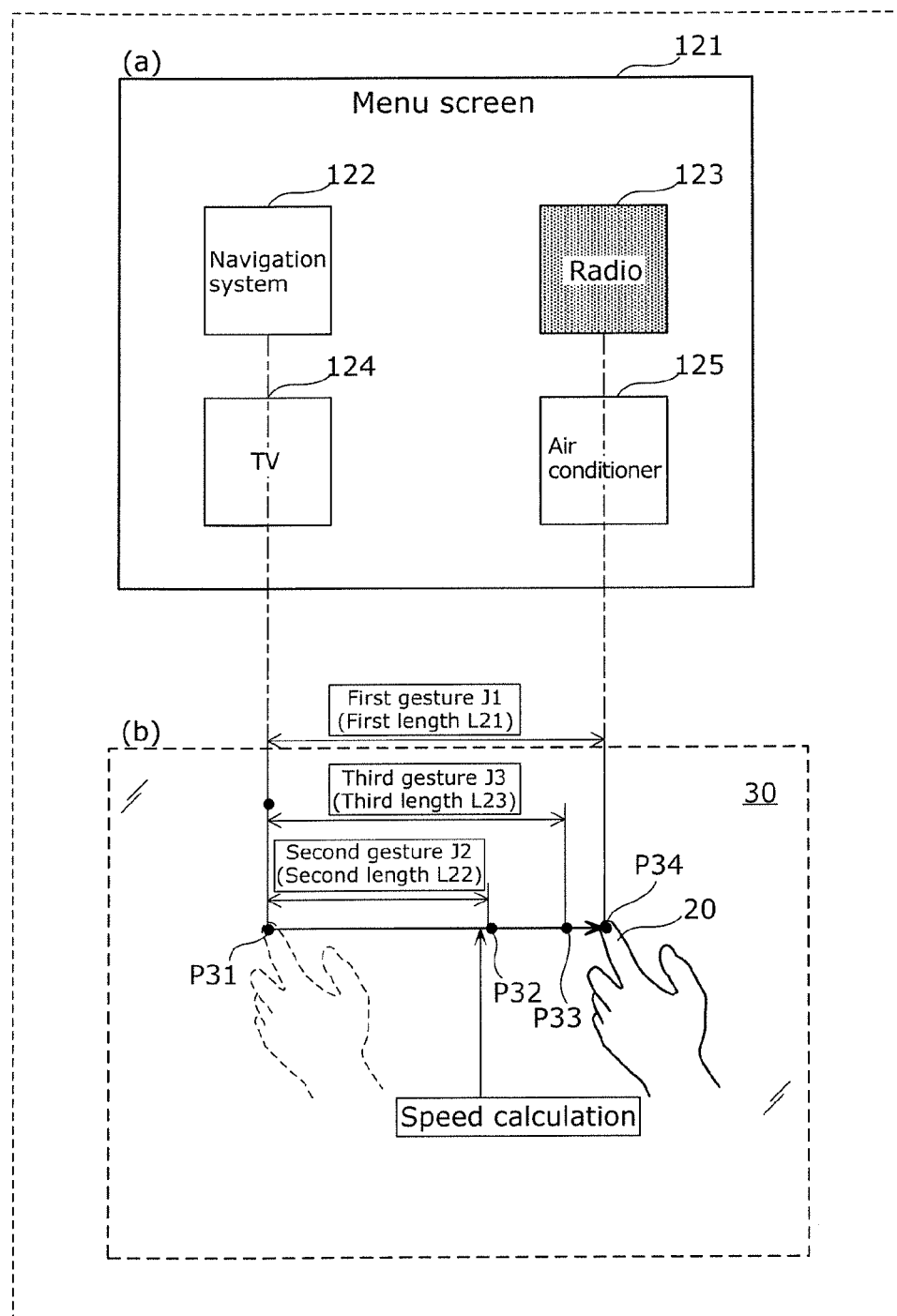
FIG. 19 illustrates another example of a method for making an input to the GUI.
Figure 20:
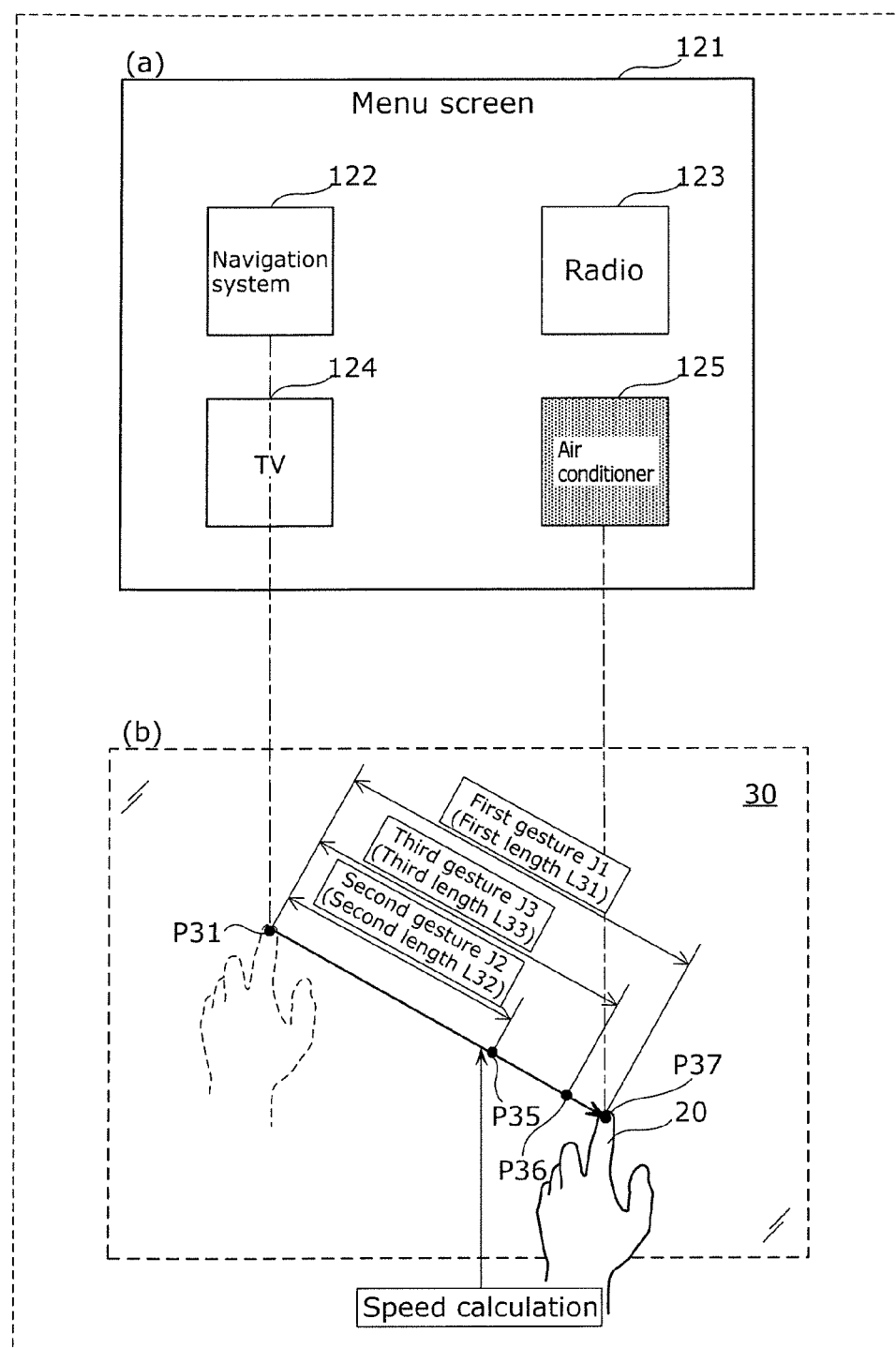
FIG. 20 illustrates another example of a method for making an input to the GUI.

A specific example in this case is described with reference to FIG. 19 and FIG. 20. Each of FIG. 19 and FIG. 20 illustrates another example of the method for making an input to the GUI. Unlike the GUI in FIG. 18, GUI 121 displayed on display 50 includes four selection targets 122, 123, 124, and 125 corresponding respectively to a navigation system, a radio, a TV, and an air conditioner. Each of these four selection targets is selected to execute an application for controlling an operation of the device corresponding to the selection target. More specifically, GUI 121 is a menu screen. Selection targets 122 to 125 of GUI 121 are arranged in at least two different directions, for example. For instance, selection targets 122 and 123 are arranged horizontally whereas selection targets 122 and 124 are arranged vertically. Moreover, selection targets 122 and 125 are arranged diagonally.

In this case, it is assumed that controller 40 may receive gestures in different directions.

First, suppose that a gesture in a first direction is received. The first direction is a rightward direction in FIG. 19 and FIG. 20, for example. To select selection target 123, first gesture 31 is made in the first direction from initial position P31 corresponding to selection target 122 on touchpad 30 toward position P34 corresponding to selection target 123 on touchpad 30, as illustrated in FIG. 19. In this case, controller 40 sets, for example: first length L21 as the first length for specifying first gesture 31 in the first direction; second length L22 as the second length for specifying second gesture 32; and third length L23 as the third length for specifying third gesture 33.

Thus, position P32 at which the input for second gesture 32 is completed is at a distance of second length L22 from initial position P31 in the first direction (rightward in FIG. 19). Similarly, a position at which the input for third gesture 33 is completed is at a distance of third length L23 from initial position P31 in the first direction.

Next, suppose that a gesture in a second direction is received. The second direction is a diagonally lower right direction in FIG. 19 and FIG. 20, for example. To select selection target 125, first gesture 31 is made in the second direction from initial position P31 corresponding to selection target 122 on touchpad 30 toward position P37 corresponding to selection target 125 on touchpad 30, as illustrated in FIG. 20. In this case, controller 40 sets, for example: first length L31, which is longer than first length L21, as the first length for specifying first gesture 31 in the second direction; second length L32, which is longer than second length L22, as the second length for specifying second gesture 32; and third length L33, which is longer than third length L23, as the third length for specifying third gesture 33.

Thus, position P35 at which the input for second gesture 32 is completed is at a distance of second length L32 from initial position P31 in the second direction (in the diagonally lower right direction in FIG. 20). Similarly, a position at which the input for third gesture 33 is completed is at a distance of third length L33 from initial position P31 in the second direction.

Selection targets 122 to 125 are rectangles, for example. In this case, when the finger moves toward any of selection targets 122 to 125 in a diagonal direction, a distance from an edge of this selection target to the center of this selection target is longer as compared to the distance when the finger moves toward this selection target in a horizontal or vertical direction. For this reason, controller 40 sets the first to third lengths to be variable depending on a direction of gesture, that is, a direction in which the finger moves. To be more specific, controller 40 sets a longer length for each of the first to third lengths when the finger moves in a diagonal direction than in the horizontal or vertical direction.

This allows the user to feel an increase of friction on the finger soon after the finger reaches a region corresponding to the selection target on touchpad 30. As a result, the accuracy of guiding the finger to a position on touchpad 30 corresponding to a desired position on GUI 121 is increased. This allows the user to easily make an input to touch sensor 31 through the gesture having a length as intended.

Moreover, controller 40 may perform the aforementioned process for a reason that a distance between selection targets 122 and 123 adjacent to each other in the first direction is smaller than a distance between selection targets 122 and 125 adjacent to each other in the second direction. As described, the lengths for specifying the gestures may be set according to a direction in which the selection targets are arranged.

Each of the components in Embodiment described above may be configured with dedicated hardware or may be implemented by executing a software program suitable for the component. Each of the components may be implemented by a program executer, such as a CPU or a processor, reading and executing a software program recorded on a hard disk or a recording medium, such as a semiconductor memory. Here, software that implements, for example, the input device according to Embodiment described above is the following program.

More specifically, this program is an input method executed by an input device that includes: a touch sensor that detects a touch position touched by an operating body on an operation screen; a vibrator that is activated in an ultrasonic band to provide haptic feedback on the operation screen; and a controller that is electrically connected to the touch sensor and the vibrator. The controller causes a computer to execute the input method including: receiving, as a first input, an input made to the touch sensor through a first gesture in a predetermined direction; activating the vibrator when the touch sensor receives a second gesture having a second length shorter than a first length of the first gesture in the predetermined direction from an initial position of the first gesture; and deactivating the vibrator when the touch sensor receives a third gesture having a third length longer than the second length and shorter than the first length in the predetermined direction from the initial position.

Although the input device and the input method according to one or more aspects of the present disclosure have been described based on the embodiments, the present invention is not limited to the embodiments. Those skilled in the art will readily appreciate that embodiments arrived at by making various modifications to the above embodiment or embodiments arrived at by selectively combining elements disclosed in the above embodiment without materially departing from the scope of the present invention may be included within one or more aspects of the present invention.

While an embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by reference in their entirety: Japanese Patent Application No. 2019-221945 filed on Dec. 9, 2019, and Japanese Patent Application No. 2020-104489 filed on Jun. 17, 2020.

INDUSTRIAL APPLICABILITY

The present disclosure is useful as an input device capable of easily making an input to a touch sensor as intended by a user, for example.

The invention claimed is:

1. An input device, comprising:
a touch sensor that detects a touch position touched by an operating body on an operation screen;
a vibrator that is activated in an ultrasonic band to provide haptic feedback on the operation screen;
a controller that is electrically connected to the touch sensor and the vibrator; and
a display that is electrically connected to the controller, wherein the controller
receives, as a first input, an input made to the touch sensor through a first gesture in a predetermined direction,
activates the vibrator when the touch sensor receives a second gesture having a second length shorter than a first length of the first gesture in the predetermined direction from an initial position of the first gesture,
deactivates the vibrator when the touch sensor receives a third gesture having a third length longer than the second length and shorter than the first length in the predetermined direction from the initial position, and
(i) causes the display to display a user interface that includes a plurality of selection targets arranged in at least two different directions, and (ii) changes the first length, the second length, and the third length in accordance with a direction in which the operating body moves on the operation screen of the touch sensor.

2. The input device according to claim 1,
wherein the controller receives, as a second input different from the first input, an input made through a fourth gesture having a fourth length exceeding the first length in the predetermined direction from the initial position.

3. The input device according to claim 2, further comprising
a load sensor that is included in the touch sensor and detects a touch load on the touch sensor,
wherein the controller further (i) calculates a moving speed of the operating body in the second gesture using an amount of change per unit time in the touch position detected by the touch sensor, and (ii) activates the vibrator with a drive voltage that decreases as the moving speed calculated increases and that also decreases as the touch load obtained from the load sensor in the second gesture decreases.

4. The input device according to claim 3,
wherein the controller activates the vibrator with the drive voltage that corresponds to the moving speed according to a first relationship in which the drive voltage of the vibrator decreases as the moving speed increases at a decrease rate that is constant with respect to the increase of the moving speed and that also corresponds to the touch load according to a third relationship in which the drive voltage decreases as the touch load decreases at a decrease rate that is constant with respect to the decrease of the touch load.

5. The input device according to claim 3,
wherein the controller activates the vibrator with the drive voltage that corresponds to the moving speed according to a second relationship in which the drive voltage of the vibrator decreases as the moving speed increases at a decrease rate that decreases as the moving speed increases and that also corresponds to the touch load according to a fourth relationship in which the drive voltage of the vibrator decreases as the touch load decreases at a decrease rate that decreases as the touch load decreases.

6. The input device according to claim 1,
wherein the controller further (i) calculates a moving speed of the operating body in the second gesture using an amount of change per unit time in the touch position detected by the touch sensor, and (ii) activates the vibrator with a drive voltage that decreases as the moving speed calculated increases.

7. The input device according to claim 6,
wherein the controller activates the vibrator with the drive voltage corresponding to the moving speed according to a first relationship in which the drive voltage of the vibrator decreases as the moving speed increases at a decrease rate that is constant with respect to the increase of the moving speed.

8. The input device according to claim 6,
wherein the controller activates the vibrator with the drive voltage corresponding to the moving speed according to a second relationship in which the drive voltage of the vibrator decreases as the moving speed increases at a decrease rate that decreases as the moving speed increases.

9. An input device, comprising:
a touch sensor that detects a touch position touched by an operating body on an operation screen;
a vibrator that is activated in an ultrasonic band to provide haptic feedback on the operation screen;
a controller that is electrically connected to the touch sensor and the vibrator; and
a display that is electrically connected to the controller, wherein the controller
receives, as a first input, an input made to the touch sensor through a first gesture in a predetermined direction,
activates the vibrator when the touch sensor receives a second gesture having a second length shorter than a first length of the first gesture in the predetermined direction from an initial position of the first gesture,
deactivates the vibrator when the touch sensor receives a third gesture having a third length longer than the second length and shorter than the first length in the predetermined direction from the initial position, and
(i) causes the display to selectively display one of a plurality of user interfaces and (ii) changes the first length, the second length, and the third length for specifying the first gesture, the second gesture, and the third gesture, respectively, according to the one of the plurality of user interfaces displayed on the display,
each of the plurality of UIs includes a plurality of selection targets,
the controller changes the first length, the second length, and the third length, in accordance with at least one of: a size of one selection target among the plurality of selection targets included in the one of the plurality of UIs displayed on the display; a total number of the plurality of selection targets; or a distance between the plurality of selection targets, and the controller reduces the first length, the second length, and the third length as the total number of the plurality of selection target increases.

10. An input device, comprising:

a touch sensor that detects a touch position touched by an operating body on an operation screen;

a vibrator that is activated in an ultrasonic band to provide haptic feedback on the operation screen;

a controller that is electrically connected to the touch sensor and the vibrator; and a display that is electrically connected to the controller, wherein the controller receives, as a first input, an input made to the touch sensor through a first gesture in a predetermined direction, activates the vibrator when the touch sensor receives a second gesture having a second length shorter than a first length of the first gesture in the predetermined direction from an initial position of the first gesture, deactivates the vibrator when the touch sensor receives a third gesture having a third length longer than the second length and shorter than the first length in the predetermined direction from the initial position, and (i) causes the display to selectively display one of a plurality of user interfaces and (ii) changes the first length, the second length, and the third length for specifying the first gesture, the second gesture, and the third gesture, respectively, according to the one of the plurality of user interfaces displayed on the display, each of the plurality of UIs includes a plurality of selection targets, the controller changes the first length, the second length, and the third length, in accordance with at least one of: a size of one selection target among the plurality of selection targets included in the one of the plurality of UIs displayed on the display; a total number of the plurality of selection targets; or a distance between the plurality of selection targets, and the controller increases the first length, the second length, and the third length as the distance between the plurality of selection targets increases.

* * * * *